US012698868B2

(12) United States Patent
Castagnos et al.

(10) Patent No.: US 12,698,868 B2
(45) Date of Patent: Aug. 4, 2026

(54) EMISSIONS MANAGEMENT MODULES AND ASSOCIATED SYSTEMS AND METHODS

(71) Applicant: Archrock Services, L.P., Houston, TX (US)

(72) Inventors: Benjamin Castagnos, Youngsville, LA (US); Tyler Davis, Cypress, TX (US); Benjamin Galassini, Thornton, CO (US); John H. Johnson, Fulshear, TX (US); Evan Elie Judice, Katy, TX (US); Michael Wasson, Katy, TX (US); Walter E. Williams, Houston, TX (US)

(73) Assignee: Archrock Services, L.P., Houston, TX (US)

( * ) Notice: Subject to any disclaimer, the term of this patent is extended or adjusted under 35 U.S.C. 154(b) by 66 days.

(21) Appl. No.: 18/973,709

(22) Filed: Dec. 9, 2024

(65) Prior Publication Data

US 2025/0172253 A1 May 29, 2025

Related U.S. Application Data

(63) Continuation of application No. 17/976,000, filed on Oct. 28, 2022, now Pat. No. 12,169,047.

(60) Provisional application No. 63/273,703, filed on Oct. 29, 2021.

(51) Int. Cl.

| | |
|---|---|
| ***F17D 5/02*** | (2006.01) |
| ***F17D 1/07*** | (2006.01) |
| ***F17D 5/00*** | (2006.01) |

(52) U.S. Cl.
CPC ................. *F17D 5/02* (2013.01); *F17D 1/07* (2013.01); *F17D 5/005* (2013.01)

(58) Field of Classification Search
CPC ............... F17D 5/02; F17D 1/07; F17D 5/005
See application file for complete search history.

(56) References Cited

U.S. PATENT DOCUMENTS 11,585,334 B2 * 2/2023 Swan ...................... F04B 53/06
2006/0042719 A1 * 3/2006 Templet ................ F04B 53/164 141/59

* cited by examiner

*Primary Examiner* — P. MaCade Nichols
(74) *Attorney, Agent, or Firm* — Reid Law Practice PLLC; Frank E. Reid

(57) ABSTRACT

A natural gas system includes a process suction conduit, a compressor package configured to receive a flow of natural gas from the process suction conduit and to increase a pressure of the flow of natural gas whereby the flow of natural gas is discharged from the compressor package as a pressurized flow of natural gas, a process discharge conduit connected downstream of the compressor package, and an emissions management module coupled to the compressor package and configured to capture emissions from the compressor package, wherein the emissions management module includes a vapor recovery unit configured to circulate the captured emissions from the VRU along an emissions discharge conduit coupled to the VRU to at least one of the process suction conduit, a fuel gas system of the natural gas system, and a hydrocarbon processing component of the natural gas system that is separate from the compressor package.

55 Claims, 13 Drawing Sheets

EMISSIONS MANAGEMENT MODULES AND ASSOCIATED SYSTEMS AND METHODS

CROSS-REFERENCE TO RELATED APPLICATIONS

This application is a continuation of U.S. non-provisional patent application Ser. No. 17/976,000 filed Oct. 28, 2022, entitled "Emissions Management Modules and Associated Systems and Methods," which claims benefit of U.S. provisional patent application Ser. No. 63/273,703 filed Oct. 29, 2021, and entitled "Emissions Management Modules and Associated Systems and Methods," both of which are hereby incorporated herein by reference in their entirety for all purposes.

STATEMENT REGARDING FEDERALLY SPONSORED RESEARCH OR DEVELOPMENT

Not applicable.

BACKGROUND

Natural gas is a naturally occurring hydrocarbon gas utilized for a variety of purposes, including as an energy source for heating, cooking, and for the generation of electricity. Natural gas may also comprise a fuel source for chemical and refining processes in the petrochemical and other industries. Natural gas systems include natural gas wells from which the natural gas is produced as well as pipeline systems through which the natural gas is transported to gathering systems, processing systems, etc., and ultimately to end users for consumption. Methane ($CH_4$), the primary component of natural gas is a greenhouse gas thought to have a potentially harmful impact on the Earth's atmosphere when released to the environment. Emissions of hydrocarbons, both accidental and by design, from the natural gas system are one of many potential sources of methane released to the environment. One potential source of leakage and/or venting of these materials from the natural gas system are natural gas compressor packages that form part of the natural gas system. Compressor packages are used, among other things, to transport natural gas to and through natural gas pipelines. Typical compressor packages of natural gas systems include a "driver" (typically a reciprocating internal combustion engine powered by natural gas) that drives a reciprocating natural gas compressor.

SUMMARY

An embodiment of a natural gas system comprises a process suction conduit, a compressor package connected downstream of the process suction conduit and configured to receive a flow of natural gas from the process suction conduit and to increase a pressure of the flow of natural gas whereby the flow of natural gas is discharged from the compressor package as a pressurized flow of natural gas, a process discharge conduit connected downstream of the compressor package and configured to receive the flow of natural gas discharged from the compressor package, and an emissions management module coupled to the compressor package and configured to capture emissions from the compressor package, wherein the emissions management module comprises a vapor recovery unit (VRU) configured to circulate the captured emissions from the VRU along an emissions discharge conduit coupled to the VRU to at least one of the process suction conduit, a fuel gas system of the natural gas system, and a hydrocarbon processing component of the natural gas system that is separate from the compressor package. In some embodiments, the VRU comprises a compressor and a motor configured to drive the compressor. In some embodiments, the emissions management module comprises a support structure, and a power source supported on the support structure and configured to power the motor of the VRU. In certain embodiments, the motor of the VRU is configured to receive electrical energy from an electrical power grid. In certain embodiments, the compressor package comprises a cooling system comprising a fan and a driveshaft configured to rotate the fan, and an electrical generator coupled to the driveshaft, wherein the generator is configured to convert rotation of the driveshaft into electrical energy, and to supply the electrical energy to the emissions management module. In some embodiments, the VRU comprises a gas ejector powered by a motive fluid flow. In some embodiments, the motive fluid flow comprises a flow of natural gas from the process discharge conduit. In certain embodiments, the natural gas system comprises a blowdown emissions conduit extending from a blowdown system of the compressor package to the VRU of the emissions management module, wherein a first valve is positioned along the blowdown emissions conduit configured to selectively isolate the VRU from the blowdown system, and a bypass conduit extending from the blowdown emissions conduit to the emissions discharge conduit, and wherein a second valve is positioned along the bypass conduit to selectively isolate the connection formed between the blowdown emissions conduit and the discharge emissions conduit formed by the bypass conduit. In certain embodiments, the natural gas system comprises an emissions inlet conduit extending from the compressor package to the VRU of the emissions management module, wherein the VRU is configured to receive emissions from at least one of a seal of a seal system of the compressor package and a vent of a vent system of the compressor package. In some embodiments, the VRU is configured to maintain the emissions inlet conduit under a vacuum. In some embodiments, the emissions management module comprises a support structure on which the VRU is supported, and wherein the support structure comprises a road transportable skid. In certain embodiments, the natural gas system comprises a plurality of the compressor packages arranged in parallel with respect to each other, and a plurality of the emissions management modules, wherein each of the emissions management modules is associated with one of the plurality of the compressor packages. In certain embodiments, the VRU comprises a high-pressure circuit comprising a high-pressure gas circulator configured to receive a first stream of emissions from the compressor package, and a low-pressure circuit separate from the high-pressure circuit and comprising a low-pressure gas circulator configured to receive a separate second stream of emissions from the compressor package. In some embodiments, at least one of the high-pressure gas circulator and the low-pressure gas circulator comprises a compressor. In some embodiments, at least one of the high-pressure gas circulator and the low-pressure gas circulator comprises a gas ejector. In certain embodiments, one of the high-pressure gas circulator and the low-pressure gas circulator discharges into a fuel gas conditioner of the compressor package. In certain embodiments, the compressor package comprises a first compressor package of a plurality of compressor packages of the natural gas system, and wherein the emissions management module is connected to the plurality of compressor packages in parallel whereby the emissions management module is configured to capture emissions from each of the plurality of compressor packages. In some embodiments, the VRU of the emissions management module is configured to circulate the captured emissions to a fuel header connected to, and upstream from, a fuel gas conditioner of the compressor package.

An embodiment of an emissions management module for a natural gas system comprises a support structure, a first emissions inlet conduit supported on the support structure and configured to receive a first stream of emissions from the natural gas system, a second emissions inlet conduit supported on the support structure and configured to receive a second stream of emissions separate from the first stream of emissions, a vapor recovery unit (VRU) supported on the support structure connected to both the first emissions inlet conduit and the second emissions inlet conduit, wherein the VRU comprises a gas circulator in fluid communication with the first emissions inlet conduit and the second emissions inlet conduit, and a discharge conduit connected to the VRU and configured to circulate the first stream of emissions and the second stream of emissions from the VRU to a component of the natural gas system. In some embodiments, the support structure comprises a road transportable skid. In some embodiments, the gas circulator of the VRU comprises a compressor and an electric motor configured to drive the compressor. In certain embodiments, the emissions management module comprises a power source supported on the support structure and configured to power the motor of the VRU. In certain embodiments, the motor of the VRU is configured to receive electrical energy from an electrical power grid. In some embodiments, the VRU comprises the gas ejector powered by a flow of natural gas from the process discharge conduit. In some embodiments, the VRU comprises a high-pressure circuit comprising a high-pressure gas circulator configured to receive a first stream of emissions from the natural gas system, and a low-pressure circuit separate from the high-pressure circuit and comprising a low-pressure gas circulator configured to receive a separate second stream of emissions from the natural gas system. In certain embodiments, at least one of the high-pressure gas circulator and the low-pressure gas circulator comprises a compressor. In certain embodiments, at least one of the high-pressure gas circulator and the low-pressure gas circulator comprises a gas ejector. In some embodiments, the emissions discharge conduit is connected between the VRU and a fuel gas conditioner of the natural gas system defining a flowpath for at least one of the first stream of emissions and the second stream of emissions extending from the VRU to the fuel gas conditioner. In some embodiments, the component comprises a hydrocarbon processing component of the natural gas system which receives an input process stream of the natural gas system and discharges a discharged process stream of the natural gas system. In certain embodiments, the emissions discharge conduit comprises at least one of a first emissions discharge conduit connected to the VRU and configured to circulate at least one of the first stream of emissions and the second stream of emissions from the VRU to a fuel gas conditioner of the compressor package, and a second emissions discharge conduit connected to the VRU and configured to circulate at least one of the first stream of emissions and the second stream of emissions from the VRU to a hydrocarbon processing component of the natural gas system that is separate from the compressor package. In certain embodiments, the emissions management module comprises a control panel configured to control the operation of the VRU of the emissions management module and a power source for powering the control panel, wherein the power source comprises one or more batteries charged by a solar panel.

An embodiment of a method for capturing emissions from a compressor package of a natural gas system comprises (a) transporting a flow of natural gas from a process suction conduit of the natural gas system to a compressor package of the natural gas system, (b) increasing a pressure of the flow of natural gas received from the process suction conduit by the compressor package, (c) discharging the flow of natural gas from the compressor package to a process discharge conduit of the natural gas system, (d) capturing emissions from the compressor package by an emissions management module of the natural gas system, and (e) circulating the captured emissions by a vapor recovery unit (VRU) of the emissions management module to at least one of the process suction conduit, a fuel gas system of the natural gas system, and a hydrocarbon processing component of the natural gas system that is separate from the compressor package. In some embodiments, the method comprises (f) generating electrical energy by an electrical generator coupled to a driveshaft of a cooling system of the compressor package, the electrical generator configured to generate the electrical energy in response to rotation of the driveshaft, and (g) supplying the electrical energy to the emissions management module. In some embodiments, (e) comprises transporting the captured emissions by a gas ejector of the VRU, wherein the gas ejector is powered by a motive fluid flow. In certain embodiments, the motive fluid flow comprises a flow of natural gas discharged by the compressor package. In certain embodiments, (d) comprises (d1) receiving blowdown emissions by the emissions management module from a blowdown system of the compressor package, and (d2) bypassing the blowdown emissions by a bypass conduit around the VRU to return the blowdown emissions to the process suction conduit whereby a pressure of the blowdown system is decreased. In some embodiments, (d) comprises receiving blowdown emissions by the emissions management module from a blowdown system of the compressor package whereby are circulated through the VRU before circulating to the process suction conduit. In some embodiments, (d) comprises separately capturing emissions from a plurality of the compressor packages of the natural gas system by the emissions management module. In certain embodiments, (d) comprises capturing a first stream of emissions from the compressor package by a high-pressure circuit of the VRU and separately capturing a second stream of emissions from the compressor package by a low-pressure circuit of the VRU that is separate from the high-pressure circuit. In certain embodiments, (e) comprises circulating the captured emissions by the VRU to at least one of a fuel header connected to, and upstream from, a fuel gas conditioner of the compressor package, and a hydrocarbon processing component of the natural gas system that is separate from the compressor package.

BRIEF DESCRIPTION OF THE DRAWINGS

For a detailed description of various exemplary embodiments, reference will now be made to the accompanying drawings in which.

DETAILED DESCRIPTION

Figure 1:
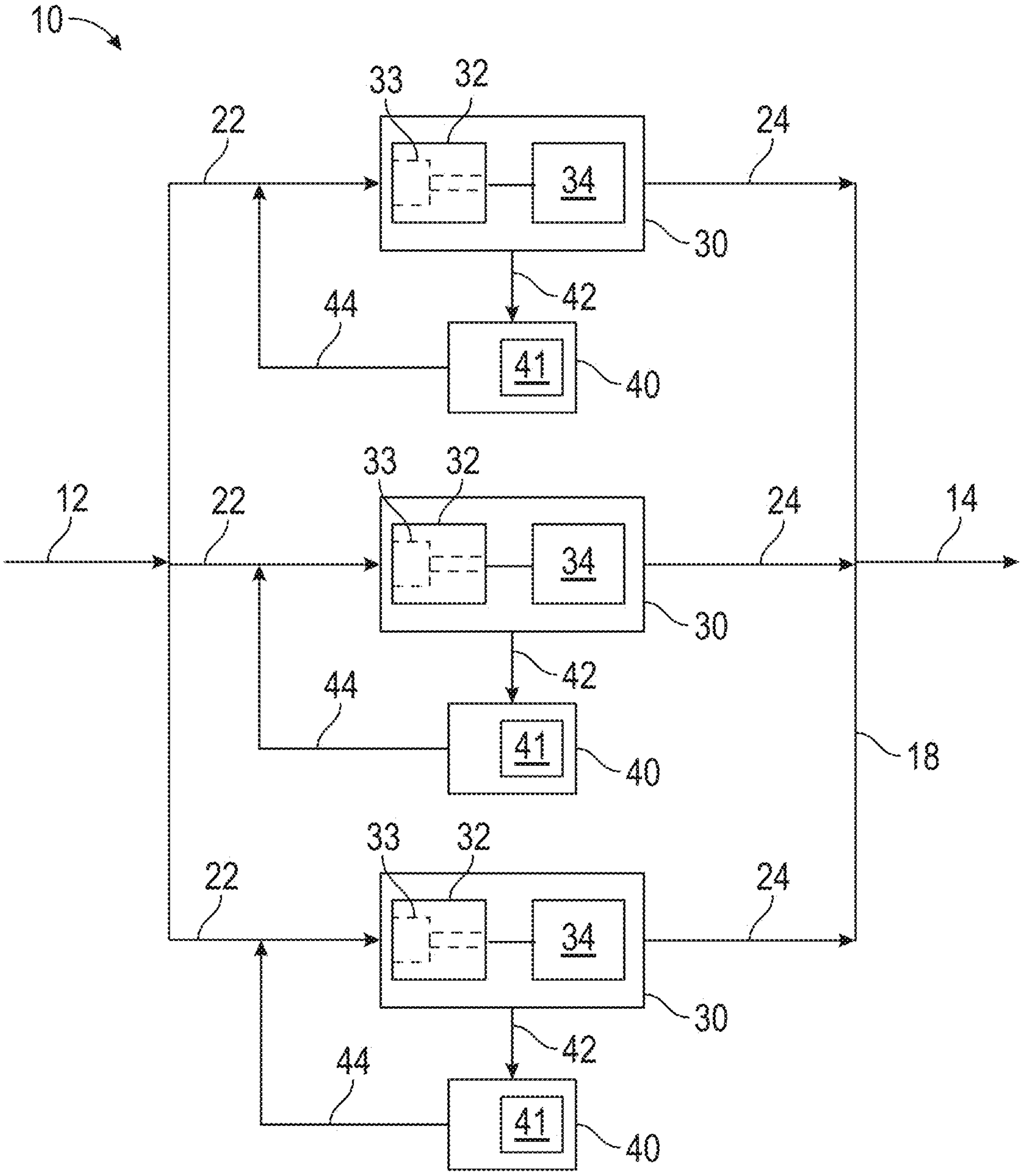
FIG. 1 is a schematic view of an embodiment of a natural gas system.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, one potential source for the leakage and/or venting of emissions, including greenhouse gasses such as natural gas and/or its combustion byproducts, to the environment are compressor packages of natural gas systems. As used herein, the term "emissions" is defined as referring to the emission or release of a hydrocarbon (e.g., methane and other materials) bearing material from a component of a natural gas system, including a compressor package of a natural gas system. Emissions may contain both hydrocarbons and other materials such as carbon dioxide. Additionally, emissions may either be accidental in the form of leaks or inadvertent releases of hydrocarbon bearing materials from a component of the natural gas system, as well as releases of hydrocarbon bearing materials by design from a component of the natural gas system, such as what typically occurs during the "blowdown" of a compressor package of conventional natural gas systems.

Typically, natural gas (again, predominantly comprising methane) and/or other greenhouse gasses may leak or be vented from various sources of the compressor package. Typically, a majority of the greenhouse gasses produced by a compressor package is the carbon dioxide produced from the exhaust of the natural gas engine of the compressor package as a result of the combustion process. However, in addition to the carbon dioxide vented by the exhaust of the natural gas engine as a result of the combustion process, compressor packages may also release emissions in other ways. For example, some compressor packages include controls (e.g., control louvers, liquid level controllers, etc.) which use natural gas as their motive power. These natural gas controls of the compressor package may vent natural gas during operation (either continuously or intermittently). Additionally, compressor packages may (accidentally or by design) vent emissions in the form of natural gas escaping from the packing cases of the piston rods of the compressor of the compressor package. As a further example, when the compressor package is shutdown due to, for example, the performance of maintenance, the natural gas present within the compressor package is conventionally vented via a blowdown system of the compressor package to either a flare or the atmosphere.

Various systems have been developed to capture one or more of these sources of greenhouse gasses emitted by compressor packages so as to minimize the amount of emissions produced by the compressor package during operation. For example, systems have been developed to capture emissions in the form of natural gas vented from the compressor package (e.g., from the blowdown system of the compressor package) and to route the captured natural gas to a vapor recovery unit of the natural gas system comprising the compressor package. The captured emissions may then be stored and/or flared whereby the natural gas is combusted prior to being released to the environment. However, these recovery systems require the building of additional stationary infrastructure in the form of tank batteries, compressors, and/or flares tailored to the specific natural gas system, increasing the overall cost associated with building and operating the natural gas system. Additionally, the flaring of captured emissions typically undesirably produces at least some greenhouse gasses which are vented to the atmosphere.

Alternatively, some conventional recovery systems route emissions captured from the compressor package directly to a fuel or air intake of the natural gas engine of the compressor package. For example, some conventional recovery systems may take advantage of the vacuum produced by the suction-side of the natural gas engine (e.g., the suction produced by a turbocharger of the natural gas engine) and thus route the captured emissions directly to the natural gas engine. Thus, some conventional recovery systems route captured emissions directly to the natural gas engine such that the natural gas engine itself may provide the motive force for conveying the emissions to the natural gas engine. The term "directly" refers in this context to the routing of the captured emissions to the natural gas engine at a location downstream from equipment of the natural gas engine for conditioning (e.g., filtering equipment, pressure control equipment) the fuel gas supplied to the natural gas engine prior to being consumed by the engine. However, it may be undesirable for a variety of reasons to route captured emissions directly to the natural gas engine of the compressor package as a fuel source for the natural gas engine. For example, the captured emissions may damage or otherwise reduce the reliability of the natural gas engine without being properly conditioned prior to being consumed by the natural gas engine. The captured emissions may also interfere with the operation of the control system used to operate the natural gas engine when the captured emissions are received by the natural gas engine downstream from equipment used to monitor the flow of fuel gas to the natural gas engine. In addition, it is not possible to utilize captured emissions as a fuel source in applications where an electric motor, rather than a natural gas engine, is utilized as the driver of the compressor package. Further, emissions captured from a blowdown system of the compressor package typically cannot be immediately utilized as a fuel source by the engine given that the engine of the compressor package is typically shut-off during the blowdown process.

Accordingly, embodiments described herein include natural gas systems comprising one or more emissions management modules configured to capture emissions from one or more compressor packages, and to circulate those captured emissions to one or more component of the natural gas system. Embodiments of emissions management modules disclosed herein may be self-contained and modularized and thus easily integrated into pre-existing natural gas systems with minimal additional work required. Particularly, the emissions management module may be connected to one or more separate compressor packages of the natural gas system whereby the emissions management module may capture emissions from a variety of different emissions sources of the one or more compressor packages. Embodiments of emissions management modules disclosed herein may advantageously connect to multiple compressor packages of a pre-existing natural gas system to capture and process emissions from the plurality of compressor packages simultaneously in parallel. The incorporation of self-contained emissions management modules into pre-existing natural gas systems may eliminate the need for additional, potentially emissions-producing infrastructure to the natural gas system, such as tank batteries and/or flares for processing the captured emissions. Moreover, the emissions captured by the subject emissions management modules do not interfere with the operation of the engine.

As will additionally be discussed herein, embodiments of emissions management modules disclosed herein may capture emissions from various sources of a compressor package. For instance, emissions management modules described herein may capture instrumentation and/or control emissions (e.g., liquid level controllers, louvers controllers, control valves), piston rod packing system emissions, and/or blowdown system emissions. Additionally, embodiments of emissions management modules disclosed herein may include a vapor recovery unit (VRU) used to circulate the captured emissions from the emissions management module to a component of the natural gas system. In some embodiments, the VRU may comprise one or more compressors. However, in other embodiments, the VRU may comprise one or more ejectors or other gas circulators driven by the flow of motive natural gas processed by the compressor package, thereby eliminating the need for a mechanically driven compressor.

As will further be discussed herein, embodiments of emissions management modules may return the captured emissions to the compressor package (or other component of the natural gas system) at a variety of locations. For example, embodiments of emissions management modules disclosed herein may return captured emissions to a suction of one or more compressor packages whereby the captured emissions may be compressed by the compressor of the one or more of the compressor packages. Additionally, embodiments of emissions management modules disclosed herein may return captured emissions to the compressor package or other hydrocarbon processing component of the natural gas system as fuel gas to be consumed by the compressor package (e.g., consumed by a driver of the compressor package) or other hydrocarbon processing component (e.g., consumed by a burner assembly of the component). As used herein, the term "hydrocarbon processing component" is defined as referring to any component of a natural gas system which receives a process stream of hydrocarbons (e.g., oil, natural gas) and may include various types of equipment including boilers, furnaces, heat exchangers, separators, compressors (including compressor packages), and other equipment. As understood in the oil and gas industry, processing equipment, as that term is characterized here, may also be referred to as production equipment and, as such, references to the former are intended to be inclusive of the latter. As will be discussed further herein, emissions management modules disclosed herein, when utilizing captured emissions as a fuel source for a natural gas engine of the compressor package, return the captured emissions to the compressor package at a location upstream from fuel gas conditioning equipment of the natural gas engine so that the returned captured emissions do not damage or otherwise hinder the operation of the natural gas engine.

Referring now to FIG. 1, an embodiment of a natural gas system 10 is shown. In this exemplary embodiment, natural gas system 10 comprises a pipeline system for transporting natural gas from a production or other natural gas system to end-users and/or consumers of the natural gas transported by natural gas system 10. However, natural gas system 10 may also comprise other types of natural gas systems including, for example, a production system in which natural gas is produced from a wellbore extending through a subterranean earthen formation.

In this exemplary embodiment, natural gas system 10 generally includes a process first or upstream pipeline 12, a process second or downstream pipeline 14, a process inlet or suction header 16, a process second or discharge header 18, a plurality of compressor packages 30 each comprising a compressor 32, and a plurality of emissions management modules 40. Natural gas system 10 is represented schematically in FIG. 1 and may include features or components not illustrated in FIG. 1. Upstream pipeline 12 receives a flow of process gas (in the form of natural gas in this exemplary embodiment) from equipment connected thereto such as another pipeline, a wellhead, a compressor package, etc., and discharges the flow of natural gas to the suction header 16.

In this exemplary embodiment, the compressor 32 of each compressor package 30 receives a portion of the flow of natural gas supplied by upstream pipeline 12 via a process suction conduit 22 which extends from the suction header 16 to the compressor package 30, and discharges a flow of natural gas to the discharge header 18 via a process discharge conduit 24 extending from the compressor package 30 to the discharge header 18. Suction header 16 is connected to each of the suction conduits 22 while discharge header 18 is connected to each of the discharge conduits 24. The compressor packages 30 of natural gas system 10 compress the flow of natural gas received by upstream pipeline 12 (via the intervening suction header 16 and suction conduit 22) and discharges the flow of natural gas to downstream pipeline 14 connected thereto (via the intervening discharge conduit 24 and discharge header 18) which transports the flow of natural gas to equipment connected thereto such as, for example, another pipeline, another compressor package, etc., until the natural gas ultimately reaches the end-users and/or consumers of the natural gas.

Compressor packages 30 of natural gas system 10 may be disposed in parallel and thus may each receive a portion of the flow of natural gas received by upstream pipeline 12. Although natural gas system 10 is shown as including three compressor packages 30 in FIG. 1, the number of compressor packages 30 of natural gas system 10 may vary. Each compressor package 30 of natural gas system 10 generally includes a compressor 32 and a driver 34 which is mechanically connected with and drives the compressor 32. As used herein, the term "driver" is defined as a component configured to produce mechanical energy for mechanically driving a compressor. For example, the driver may produce mechanical energy in the form of rotational torque for rotating a crankshaft of a reciprocating compressor. Drivers may be powered by a variety of distinct energy sources. As one example, a driver may comprise a natural gas engine which combusts natural gas to produce rotational torque. As another example, a driver may comprise an electric motor which produces rotational torque from electrical energy supplied to the electric motor.

In this exemplary embodiment, compressor 32 comprises a reciprocating compressor including a reciprocating piston rod assembly 33; however, in other embodiments the configuration of compressor 32 may vary. Additionally, in this exemplary embodiment, driver 34 comprises an engine powered by natural gas and thus may also be referred to herein as natural gas engine 34. For example, driver 34 may be powered by the flow of natural gas received by the compressor package 30 from the upstream pipeline 12; however, in other embodiments, the configuration of driver 34 may vary. In some embodiments, driver 34 comprises a reciprocating internal combustion engine. In other embodiments, driver 34 may not comprise an engine and instead may comprise, for example, an electric motor and/or other component (a hydraulic drive, etc.) for producing mechanical energy to mechanically drive the compressor 32. Thus, driver 34 may also be referred to herein as electric motor 34.

Emissions management modules 40 of natural gas system 10 capture emissions produced from the compressor packages 30 to thereby reduce the amount of emissions, including greenhouse gasses (primarily methane), communicated, directly or indirectly, to the atmosphere by compressor packages 30 during the operation of natural gas system 10. The emissions captured by emissions management modules 40 may comprise, for example, natural gas vented from controls of compressor packages 30 accidentally (e.g., via damage or failure) or by design (e.g., natural gas-actuated pneumatic controllers), emissions from the packing of piston rod assembly 33 (e.g., via damage or failure), emissions from a blowdown system of compressor packages 30 (accidentally or intentionally), and/or other sources of emissions of compressor packages 30. In this exemplary embodiment, emissions management modules 40 recycle the captured emissions and return them to the process stream (i.e., the natural gas stream that is being processed/compressed by the compressor packages 30) upstream from the compressor packages 30 from which the emissions are captured such as, for example, to the suction header 16 and/or one or more of the suction conduits 22. In this manner, the emissions captured by emissions management modules 40 may be recycled back into the flow of natural gas and ultimately discharged to the discharge pipeline 14 once compressed by compressor packages 30. It may be understood that in other embodiments the captured emissions may be consumed as fuel gas by one or more components of the natural gas system 10.

In this exemplary embodiment, each emissions management module 40 is connected to a corresponding compressor package 30. Particularly, each emissions management module 40 is connected to a corresponding compressor package 30 by one or more emissions inlet conduits 42 extending from the compressor package 30 to the emissions management module 40. Additionally, an emissions discharge conduit 44 extends from the emissions management module 40 to the suction conduit 22 extending to the compressor package 30 associated with the given emissions management module 40. In this configuration, the emissions management module 40 captures emissions (primarily methane) from the corresponding compressor package 30 via emissions inlet conduit 42, and returns or recycles the emissions to the suction conduit 22 via emissions discharge conduit 44. In this configuration, a continuous loop is formed which includes suction conduit 22, compressor package 30, emissions inlet conduit 42, emissions management module 40, and emissions discharge conduit 44. In other embodiments, emissions discharge conduit 44 may extend to the suction header 16 rather than the suction conduit 22 and/or to some other natural gas conduit located upstream from the compressor package 30.

Additionally, each emissions management module 40 includes equipment to process or condition the emissions captured from the corresponding compressor package 30 prior to returning the captured emissions to the suction conduit 22 positioned upstream from the compressor package 30. In this exemplary embodiment, each emissions management module 40 comprises a VRU 41 including a gas circulator for driving the circulation of the emissions captured from the corresponding compressor package 30 such that the emissions may be circulated to the suction conduit 22. As used herein, the term "gas circulator" is defined as referring to any device configured for driving or powering the circulation of gas from a first location to a second location. The gas circulators described herein may have one or more moving (e.g., rotating) parts driven by a power source. Alternatively, gas circulators disclosed herein may not include any moving parts and instead may be driven by a motive fluid. For example, the gas circulator of VRU 41 may comprise a compressor, an ejector or eductor, and/or other devices known in the art for circulating a gas stream. The VRU 41 may be powered by a power supply of the emissions management module 40 (e.g., a generator, a solar panel or array) or via an external source of power such as power supplied by the associated compressor package 30, another external source of power such as an electric grid, or motive natural gas downstream of natural gas system 10.

Emissions management modules 40 provide a means for capturing emissions produced by compressor packages 30 while minimizing the additional infrastructure which must be added to natural gas system 10. For example, an additional tank battery or flare need not be connected to emissions management modules 40 given that emissions management modules 40 conveniently recycle the captured emissions to the suction conduits 22 of natural gas system 10 where the emissions may be processed and discharged by compressor packages 30 to the downstream pipeline 14, thereby preserving the captured emissions for downstream processing and sale rather than having the captured emissions potentially communicated to the atmosphere. Indeed, emissions management modules 40 may conveniently be added to a pre-existing natural gas system with minimal modification to the natural gas system needed to interface the emissions management modules 40 with the natural gas system. Additionally, emissions management modules 40 do not feed the captured emissions directly to the driver 34 (downstream from any fuel gas conditioning equipment of the driver 34 such as a fuel filter or pressure regulator of driver 34) of the associated compressor package 30, avoiding the undesirable effects (e.g., decline in reliability and/or performance of driver 34) associated with routing emissions directly to the driver 34 as a fuel source for the driver 34.

Figure 2:
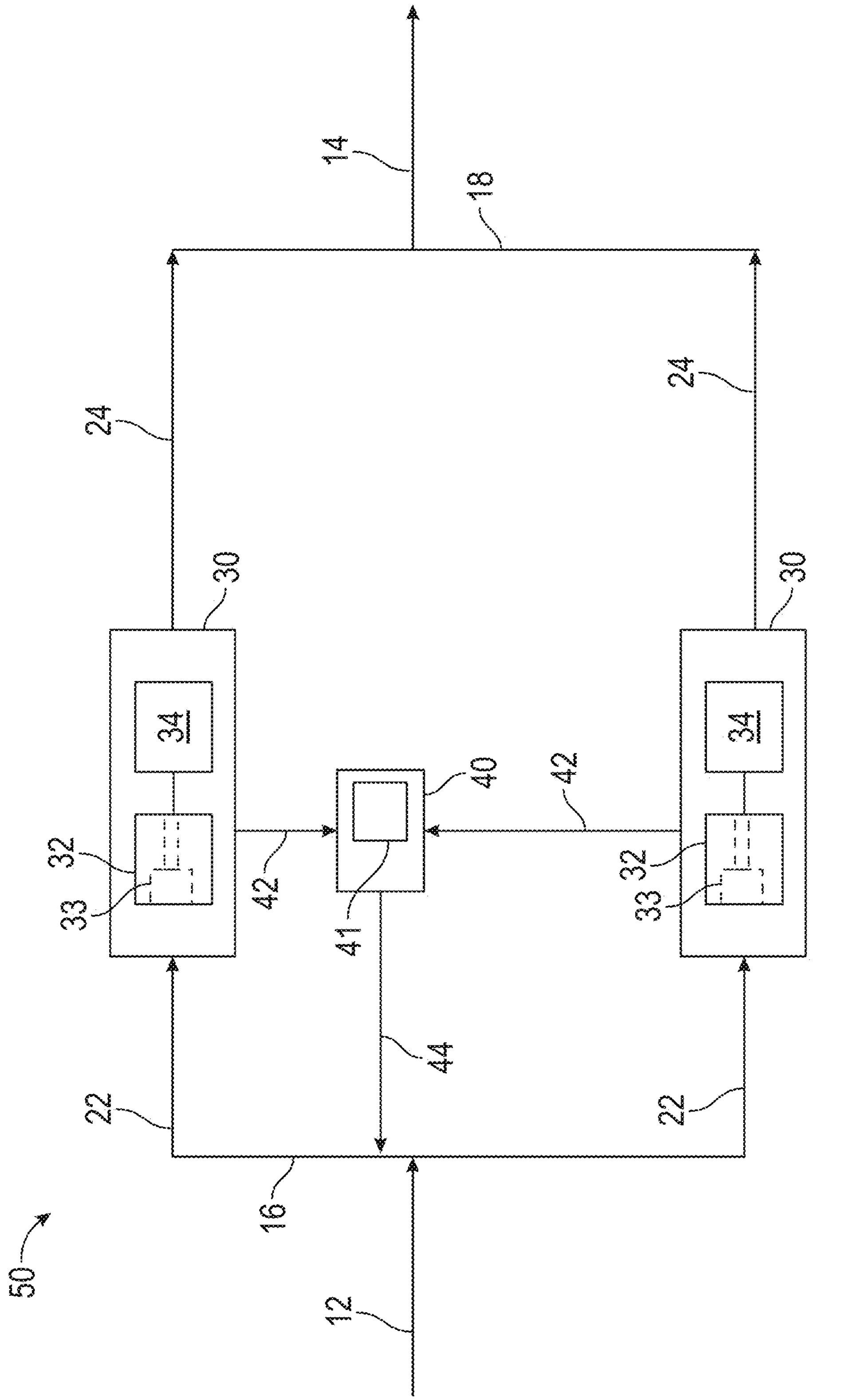
FIG. 2 is a schematic view of another embodiment of a natural gas system.

Referring briefly to FIG. 2, another embodiment of a natural gas system 50 is shown. Natural gas system 50 includes features in common with natural gas system 10 shown in FIG. 1, and shared features are labeled similarly. Particularly, in this exemplary embodiment, natural gas system 50 includes an emissions management module 40 which captures emissions from a plurality of separate compressor packages 30. Additionally, in this exemplary embodiment, emissions discharge conduit 44 extends from emissions management module 40 to the suction header 16. Thus, emissions captured by emissions management module 40 are recirculated to each of the compressor packages 30 of natural gas system 50. While in this exemplary embodiment emissions management module 40 captures emissions from a pair of compressor packages 30, in other embodiments a single emissions management module 40 may capture emissions from more than two separate compressor packages 30. The ratio of compressor packages 30 to emissions management modules 40 may vary depending the requirements of the particular application.

Figure 3:
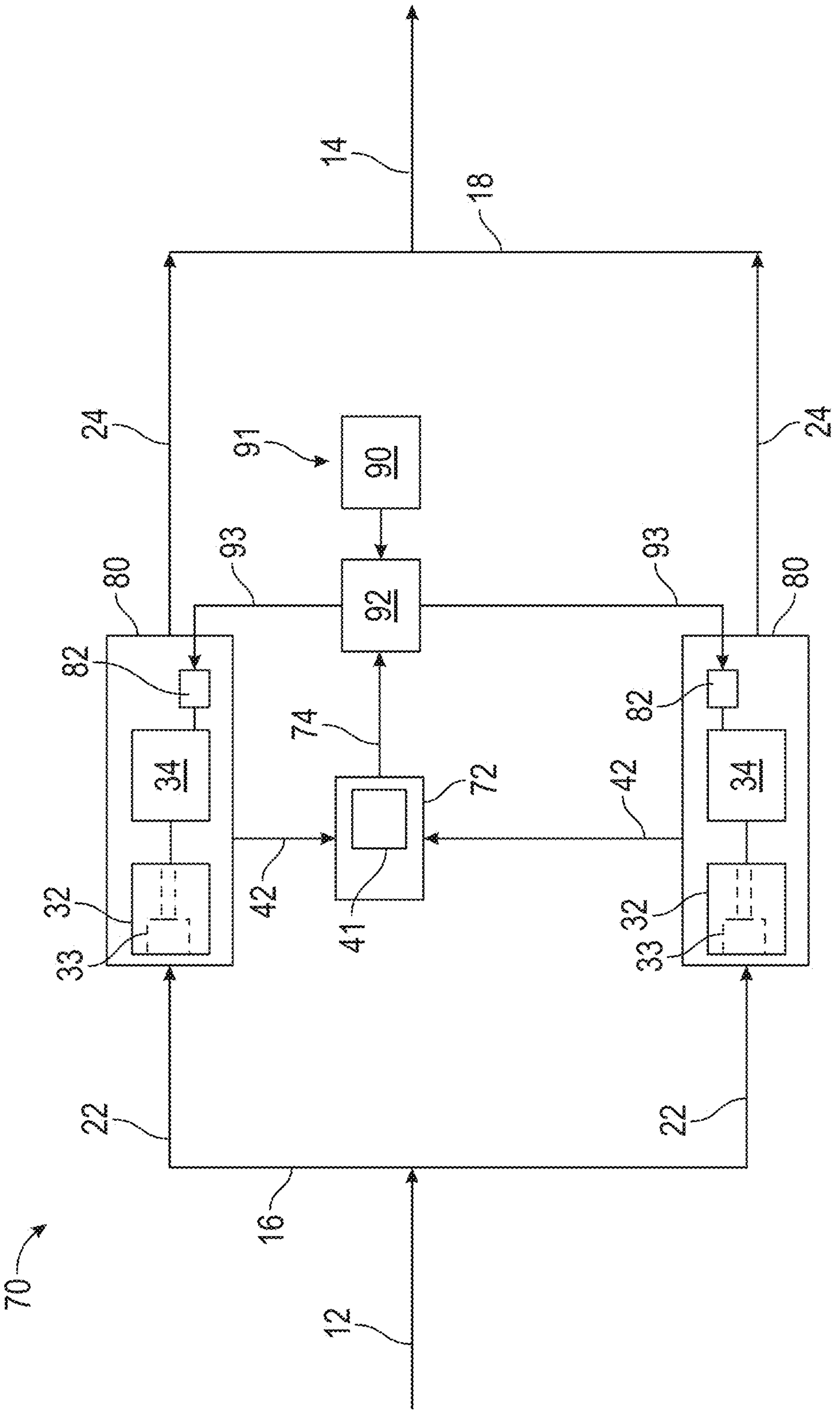
FIG. 3 is a schematic view of another embodiment of a natural gas system.

Referring to FIG. 3, another embodiment of a natural gas system 70 is shown. Natural gas system 70 includes features in common with natural gas system 10 shown in FIG. 1 and natural gas system 50 shown in FIG. 2, and shared features are labeled similarly. In this exemplary embodiment, natural gas system 70 includes a pair of compressor packages 80 and an emissions management module 72 which captures emissions from the pair of compressor packages 80.

Particularly, each compressor package comprises a fuel gas conditioner 82 configured to filter or condition fuel gas supplied to the driver 34 of the compressor package 80 (the driver 34 being in fluid communication with the fuel gas conditioner 82) by a fuel source 90 of the natural gas system 70. Fuel gas conditioner 82 comprises equipment for conditioning the fuel gas before it is consumed by the driver 34. In some embodiments, fuel gas conditioner 82 comprises a fuel filter, a liquid separator, and/or one or more pressure regulators. In this exemplary embodiment, natural gas system 70 additionally includes a fuel header or manifold 92 positioned between the fuel source 90 and the pair of compressor packages 80, the fuel header 92 serving to distribute fuel gas from the fuel source 90 to the pair of compressor packages 80. Particularly, in this exemplary embodiment, a pair of fuel gas conduits 93 extend from the fuel header 92 to the fuel filters 82 of the pair of compressor packages 80, thereby connecting the fuel header 92 with the compressor packages 80. In this configuration, the fuel filters 82 of compressor packages 80 are located downstream from the fuel header 92, which is similarly located downstream from the fuel source 90. In some embodiments, fuel source 90 may comprise natural gas diverted from the upstream pipeline 12 and/or suction conduits 22 of the natural gas system 70. Thus, the fuel source 90 may comprise a suction-side component (e.g., upstream pipeline 12 and/or suction conduits 22) of natural gas system 70. In other embodiments, fuel may be sourced from a compressor discharge, interstage compression, or a non-compression gas source of the natural gas system 70.

In this exemplary embodiment, emissions management module 72 receives emissions captured from compressor packages 80 via emissions inlet conduits 42, and return the captured emissions to a fuel system 91 of the natural gas system 70 including the fuel source 90, fuel header 92, and fuel gas conduits 93. Particularly, emissions management module 72 returns at least a portion of the captured emissions to the fuel header 92, upstream from the fuel filters 82 of the compressor packages 80. The captured emissions, after being filtered or otherwise conditioned by fuel filters 82 may be consumed by drivers 34 of compressor packages 80 to assist in powering the drivers 34. In some instances, providing the captured emissions to the drivers 34 as fuel may maximize the efficiency of the natural gas system 70 by reducing the amount of captured emissions which are directed to compressor packages 80 to be compressed by the compressors 32 of packages 80.

As will be discussed further herein, the VRU 41 of emissions management module 72 may apply a motive force or pressure (positive or negative pressure) to the captured emissions permitting the captured emissions to be communicated from the module 72 to the fuel header 92 thereof without reliance on drivers 34 themselves to provide said motive force. This permits the captured emissions to be routed upstream of the fuel filters 82 of compressor packages 80 such that the captured emissions may be properly filtered or otherwise conditioned before being supplied to drivers 34. In this manner, the captured emissions directed to the fuel system 91 by emissions management module 72 appears as just another fuel source (in addition to fuel source 90) to the fuel header 92, limiting or preventing any undesirable impacts to the operation of drivers 34 through the inclusion of the captured emissions in the fuel sources thereof, while also minimizing the amount of work required to incorporate the emissions management module 70 into a preexisting natural gas system (e.g., the natural gas system 70 shown in FIG. 3). Particularly, an emissions discharge conduit 74 of the emissions management module 72 may merely be connected between the emissions management module 72 and the fuel header 92. The connection formed between emissions discharge conduit 74 and fuel header 92 may be like any other connection formed between fuel header 92 and other components of fuel system 91, such as the connection formed between fuel source 90 and fuel header 92.

While in this exemplary embodiment the fuel system 91 of natural gas system 70 includes fuel source 90, fuel header 92, and fuel gas conduits 93, it may be understood that in other embodiments fuel system 91 may not include fuel header 92 with emissions discharge conduit 74 being connected to fuel system 91 at another location also located upstream from the fuel filters 82 (e.g., connected to the fuel gas conduits 93) of compressor packages 80 similarly permitting the captured emissions to be filtered or otherwise conditioned by fuel filters 82 before being supplied to drivers 34. It may similarly be understood that fuel system 91 may include additional components not shown in FIG. 3.

Figure 4:
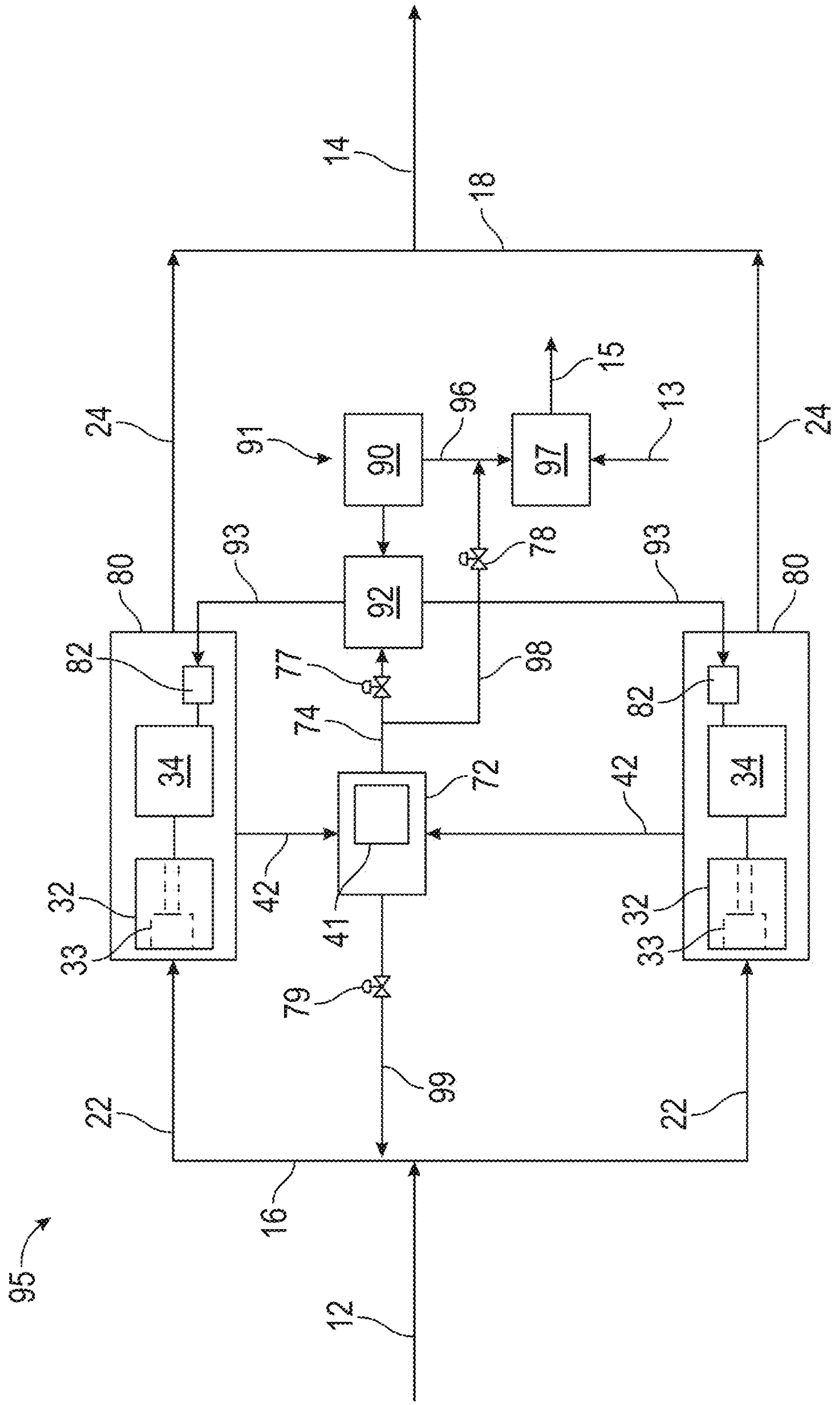
FIG. 4 is a schematic view of another embodiment of a natural gas system.

Referring to FIG. 4, another embodiment of a natural gas system 95 is shown. Natural gas system 95 includes features in common with natural gas system 10, 50 and 70 shown in FIGS. 1, 2 and 3, respectively, and shared features are labeled similarly. Natural gas system 95 includes the pair of compressor packages 80 and the emissions management module 72 described above. Additionally, in this exemplary embodiment, natural gas system 95 includes a hydrocarbon processing component 97 coupled to the emissions management module 72.

The hydrocarbon processing component 97 of natural gas system 95 may comprise various types of equipment used in the processing and production of process gas (e.g., natural gas) accomplished by the natural gas system 95. Hydrocarbon processing component 97 may not otherwise be directly connected or otherwise directly associated with either of the compressor packages 80 and instead may relate to an unrelated subsystem of the natural gas system 95. As an example, hydrocarbon processing component 97 may comprise a pressure vessel such as a boiler, a furnace, a compressor package, a heat exchanger, etc. Indeed, compressor packages 80 comprise hydrocarbon processing components and may also be referred to herein as such.

Hydrocarbon processing component 97 receives an inlet process gas stream 13 of the natural gas system 95, processes the natural gas received from the inlet process stream 13, and discharges a discharge process gas stream 15 which is supplied or distributed to other equipment of natural gas system 95. The natural gas comprising the inlet process gas stream 13 and/or the natural gas comprising discharge process gas stream 15 may be similar in composition to the natural gas flowing through upstream pipeline 12. Additionally, the hydrocarbon processing component 97 receives fuel gas from a fuel gas conduit 96 extending to the hydrocarbon processing component 97 from the fuel source 90 of fuel gas system 91. The fuel gas supplied to the hydrocarbon processing component 97 via fuel gas conduit 96 is consumed by the component 97 as part of processing the inlet process gas stream 13 received by the hydrocarbon processing component 97. For example, the fuel gas supplied to hydrocarbon processing component 97 may be burned in a burner assembly of the hydrocarbon processing component 97 to heat the inlet process gas stream 13 to assist in separating as desired one fraction of the inlet process gas stream 13 from another fraction of the inlet process gas stream 13.

In this exemplary embodiment, in addition to being configured to discharge emissions captured from compressor packages 80 to the fuel header 92 via the emissions discharge conduit 74, emissions management module 72 is also configured to discharge captured emissions to the hydrocarbon processing component 97 via a branch emissions discharge conduit 98, and to the suction header 16 via a supplemental emissions discharge conduit 99. Particularly, in this exemplary embodiment, branch emissions discharge conduit 98 extends from the emissions discharge conduit 74 to the fuel gas conduit 96 extending to the hydrocarbon processing component 97. Alternatively, branch emissions discharge conduit 98 may extend directly between emissions management module 72 and the fuel gas conduit 96. Additionally, in this exemplary embodiment, the supplemental emissions discharge conduit 99 extends from the emissions management module 72 to the suction header 16. Alternatively, supplemental emissions discharge conduit 99 may extend from the emissions discharge conduit 74 to the suction header 16.

In this exemplary embodiment, captured emissions may be circulated from the VRU 41 of emissions management module 72 to the fuel filters 82 of compressor packages 80, the hydrocarbon processing component 97, and/or to the suction header 16. In this exemplary embodiment, valves 77, 78, and 79 are positioned along each of conduits 74, 98, and 99, respectively, whereby conduits 74, 98, and 99 may be selectably isolated as desired by an operator of natural gas system 95.

As an example, a valve 79 positioned along the supplemental emissions discharge conduit 99 may be closed whereby emissions captured from compressor packages 80 are directed from the emissions management module 72 to the fuel header 92 and hydrocarbon processing component 97 (as fuel gas delivered to component 97 via the fuel gas conduit 96) but not to the suction header 16. Alternatively, a valve 78 positioned along branch emissions discharge conduit 98 may be closed whereby captured emissions are directed from the emissions management module 72 to the fuel header 92 and suction header 16 but not to the hydrocarbon processing component 97. As an additional alternative, a valve 77 positioned along emissions discharge conduit 74 may be closed whereby captured emissions are directed from the emissions management module 72 to the hydrocarbon processing component 97 and suction header 16 but not to the fuel header 92. As an additional alternative, multiple valves 77, 78, and 79 may be closed at a given time such that captured emissions are directed from the emissions management module 72 to only one of the suction header 16, fuel header 92, and hydrocarbon processing component 97. As a further alternative, each of the valves 77, 78, and 79 may be open whereby captured emissions are directed from the emissions management module 72 concurrently to the suction header 16, fuel header 92, and hydrocarbon processing component 97. The selection of which valves 77, 78, and 79 to close and which of valves 77, 78, and 79 to remain open may be based on the current needs of the natural gas system 95, such as, among other reasons, the current volume of captured emissions being discharged from the emissions management module 72.

Figure 5:
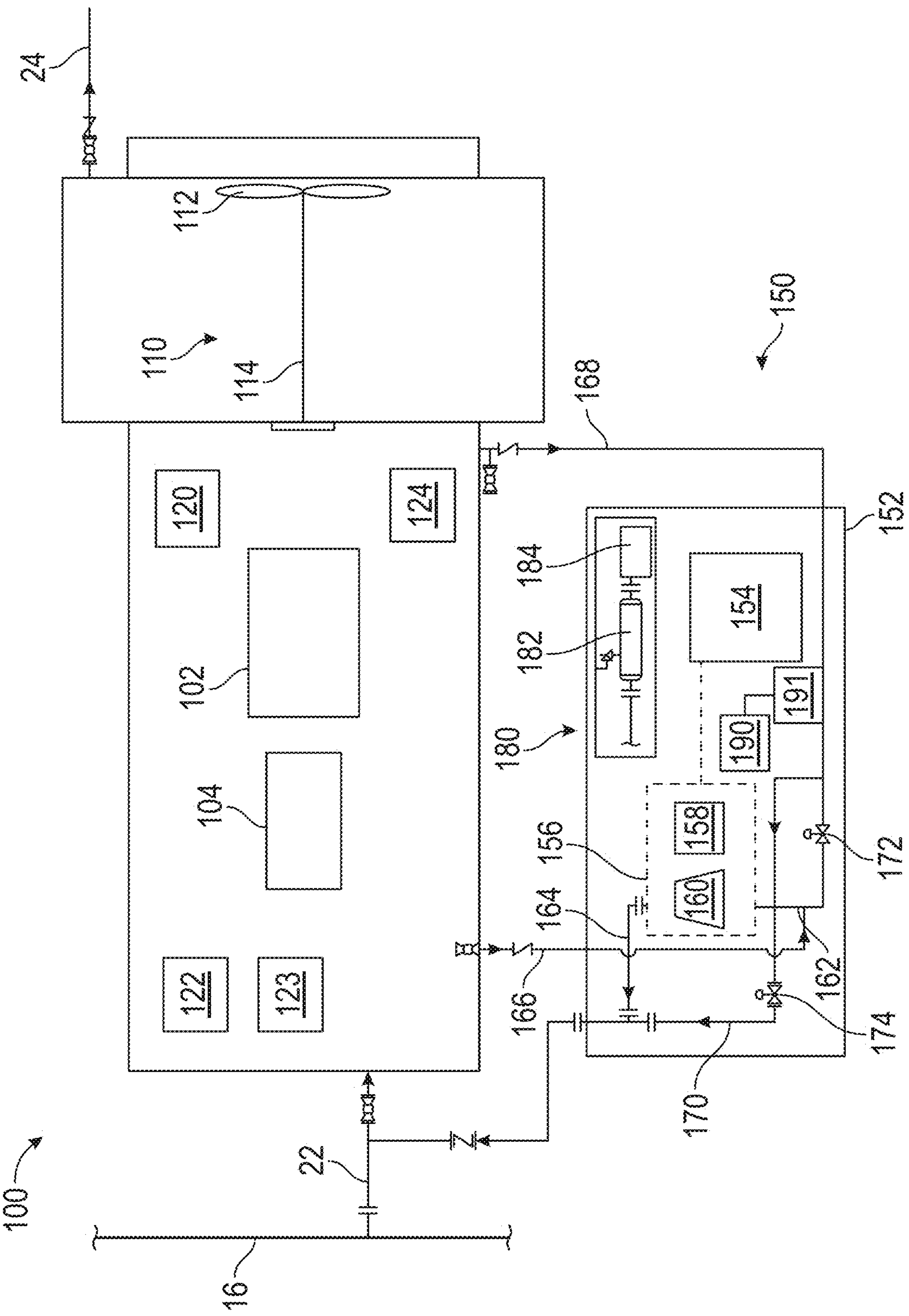
FIG. 5 is a schematic view of embodiments of a compressor package and an emissions management module of the natural gas system of FIG. 1.

Referring now to FIG. 5, an embodiment of a compressor package 100 and an emissions management module 150 of a natural gas system are shown in greater detail. The compressor package 100 shown in FIG. 5 may comprise one or more of the compressor packages 30 while the emissions management module 150 shown in FIG. 5 may comprise one or more of the emissions management modules 40 of the natural gas system 10 (or other natural gas systems) shown in FIG. 1. In this exemplary embodiment, compressor package 100 generally includes a driver 102 and a reciprocating compressor 104 driven by the driver 102. In this exemplary embodiment, driver 102 comprises a natural gas engine; however, in other embodiments, the configuration of driver 102 may vary. For example, in other embodiments, driver 102 may comprise an electric motor. Additionally, compressor package 100 includes a cooling system 110 for cooling components of the compressor package 100 including driver 102 and/or compressor 104. In this exemplary embodiment, cooling system 110 includes, among other features, a cooling fan 112 driven by a driveshaft 114. Driveshaft 114 of cooling system 110 may be driven by the driver 102 of compressor package 100.

In this exemplary embodiment, emissions management module 150 generally includes a support structure 152, an onboard power source 154, a VRU 156, an air system 180, and a control panel or system (illustrated schematically by box 190 in FIG. 5) for controlling the operation of at least some components of emissions management module 150. In this exemplary embodiment, support structure 152 may comprise a skid upon which the components of emissions management module 150 (e.g., onboard power source 154, VRU 156, air system 180, etc.) are positioned. However, in other embodiments, the configuration of support structure 152 may vary. For instance, in some embodiments, support structure 152 may comprise a road-transportable trailer. The onboard power source 154 provides power to components of emissions management module 150 including, for example, VRU 156. In this exemplary embodiment, onboard power source 154 comprises an electrical generator powered by the flow of natural gas provided by suction header 16 of natural gas system 10. However, in other embodiments, the configuration of onboard power source 154 may vary. Additionally, in this exemplary embodiment, onboard power source 154 provides 460 volt (V) three-phase electrical power to the components of emissions management module 150; however, it may be understood that the type and magnitude of power outputted by onboard power source 154 may vary depending on the given application.

The VRU 156 of emissions management module 150 processes emissions captured by emissions management module 150 from compressor package 100 prior to returning the captured emissions to natural gas system 10 at a location upstream from compressor package 100. VRU 156 of emissions management module 150 generally includes a motor 158 and a gas circulator 160 driven by the motor 158. In this exemplary embodiment, gas circulator 160 comprises a compressor and thus may also be referred to herein as compressor 160. Additionally, in this exemplary embodiment, motor 158 comprises an electric motor powered by the onboard power source 154 of emissions management module 150; however, in other embodiments, the configuration of motor 158 may vary. For example, in other embodiments, motor 158 may comprise a natural gas motor powered by the flow of natural gas provided by suction header 16. Compressor 160 is mechanically driven by motor 158 and may comprise a rotary compressor which may include a screw, scroll, rotary vane or other types of rotors. In other embodiments, compressor 160 may comprise a reciprocating compressor. As will be discussed further herein, compressor 160 compresses emissions received by the VRU 156 prior to returning the emissions to the suction of compressor package 100. Particularly, in this exemplary embodiment, VRU 156, and particularly compressor 160, receive emissions via an emissions suction conduit 162 and discharge pressurized emissions via an emissions discharge conduit 164 of emissions management module 150.

The air system 180 of emissions management module 150 provides compressed or pressurized air to power features of compressor package 100 via one or more conduits (not shown in FIG. 5) extending between emissions management module 150 and compressor package 100. The compressed air provided by air system 180 may replace the natural gas used to power at least some of the pneumatically powered instrumentation and/or controls (illustrated schematically by box 120 in FIG. 5) of compressor package 100 such as, for example, louvers of cooling system 110, liquid level controllers, pre-lube motors, the starter motor, etc., of compressor package 100. The amount of greenhouse gasses produced by compressor package 100 during operation may be reduced by substituting natural gas with air for powering at least some of the instrumentation and/or controls 120 of compressor package 100 via the air system 180 of emissions management module 150. Additionally, by housing air system 180 on the emissions management module 150, the amount of additional infrastructure to be provided by compressor package 100 (e.g., an air compressor, etc.) may be minimized.

In this exemplary embodiment, air system 180 generally includes an air receiver 182 and an air compressor 184. Air compressor 184 may be powered by onboard power source 154 of emissions management module 150; however, the configuration and manner of powering air compressor 184 may vary in other embodiments. In still other embodiments, emissions management module 150 may not include air system 180. In some embodiments, air system 180 may also include an air dryer to reduce moisture in the air after it is compressed by air compressor 184.

Emissions management module 150 may capture emissions from compressor package 100 from various sources of compressor package 100. For example, in this exemplary embodiment, a first emissions inlet conduit 166 and a second emissions inlet conduit 168 each extend from compressor package 100 to the suction conduit 162 of emissions management module 150. In other embodiments, the number of emissions conduits extending from compressor package 100 to the suction conduit 162 of emissions management module 150 may vary from that shown in FIG. 5. In this exemplary embodiment, first emissions inlet conduit 166 may receive emissions vented from a variety of sources from compressor package 100. For example, the emissions received by first emissions inlet conduit 166 may include vented natural gas from a seal system (indicated schematically by box 122 in FIG. 5), and/or vent system (indicated schematically by box 123 in FIG. 5) of the compressor package 100. The seal system 122 of compressor package 100 comprises various seals of the compressor package 100 used to seal various corresponding interfaces of the compressor package 100 and which may inadvertently emit emissions over time as the performance of the given seal degrades. For example, seal system 122 may include piston rod packing seals which seal the piston rod assembly 33 of compressor package 100, variable volume pocket seals, and others. The vent system 123 of compressor package 100 comprises various vents of the compressor package 100 used to vent, by design, various emissions for various purposes. For example, the vent system 123 may include vented emissions originating from instrumentations and/or controls 120 of compressor package 100. Vent system 123 may also include emissions vented by so called "breathers" of the compressor package 100 such as, for example, a compressor frame breather, an engine crankcase breather of the compressor package 100.

The emissions received by first emissions inlet conduit 166 may include sources of emissions produced by compressor package 100 other than those originating from seal system 122 and vent system 123. For example, the emissions received by first emissions inlet conduit 166 may also include exhaust gas from a starter motor used to start the driver 102 of compressor package 100, and a pre-lube motor associated with a lubrication system of compressor package 100.

Second emissions inlet conduit 168 is configured to receive emissions from a blowdown system (indicated by box 124 in FIG. 4) used to vent natural gas from compressor package 100 when package 100 is shut down for maintenance or other purposes. In some applications, the blowdown emissions vented to second emissions inlet conduit 168 may be at a relatively high pressure which cannot be directly fed to the VRU 156 of emissions management module 150. Thus, in this exemplary embodiment, emissions management module 150 includes a blowdown bypass conduit 170 extending from the second emissions inlet conduit 168 to the discharge conduit 164. Additionally, a first or low pressure (LP) blowdown valve 172 is positioned along second emissions inlet conduit 168 between the suction conduit 162 and the location at which blowdown bypass conduit 170 connects with second emissions inlet conduit 168. Further, a second or high pressure (HP) blowdown valve 174 is positioned along blowdown bypass conduit 170. In some embodiments, the operation of blowdown valves 172, 174 may be controlled by control panel 190 powered by a power source 191. Power source 191 may be located on and/or off support structure 152 and may comprise batteries, a solar panel or array to charge one or more batteries, and/or other power sources.

Upon shutting down compressor package 100, LP blowdown valve 172 may be in a closed position while HP blowdown valve 174 is an open position, permitting pressurized blowdown emissions within second emissions inlet conduit 168 to bypass VRU 156 and flow into the suction conduit 22 via discharge conduit 164. The additional volume provided by suction header 16 and suction conduit 22 allows for the pressure within blowdown system 124 and second emissions inlet conduit 168 to bleed down to a desired reduced pressure equal to the fluid pressure within suction header 16. Once pressure within blowdown system 124 and second emissions inlet conduit 168 have bled down to the reduced pressure, HP blowdown valve 174 may be closed to force the blowdown emissions to flow through VRU 156 for processing rather than bypassing VRU 156 via blowdown bypass conduit 170. In this manner, high pressure emissions from blowdown system 124 may be processed by the same VRU 156 used to process low pressure emissions from either of the seal system 122 or vent system 123 of compressor package 100, eliminating the need for separate VRUs 156 and/or separate emissions management modules 150 to service the same compressor package 100.

It may be understood that the configuration of emissions management module 150 (e.g., the configuration, placement, and/or arrangement of VRU 156, conduits 162, 164, valves 172, 174, etc.) shown in FIG. 5 is only exemplary and in other embodiments the configuration of emissions management module 150 may vary. For example, in other embodiments, emissions management module 150 may include components not shown in FIG. 5 and/or may not include at least some of the features shown in FIG. 5.

Figure 6:
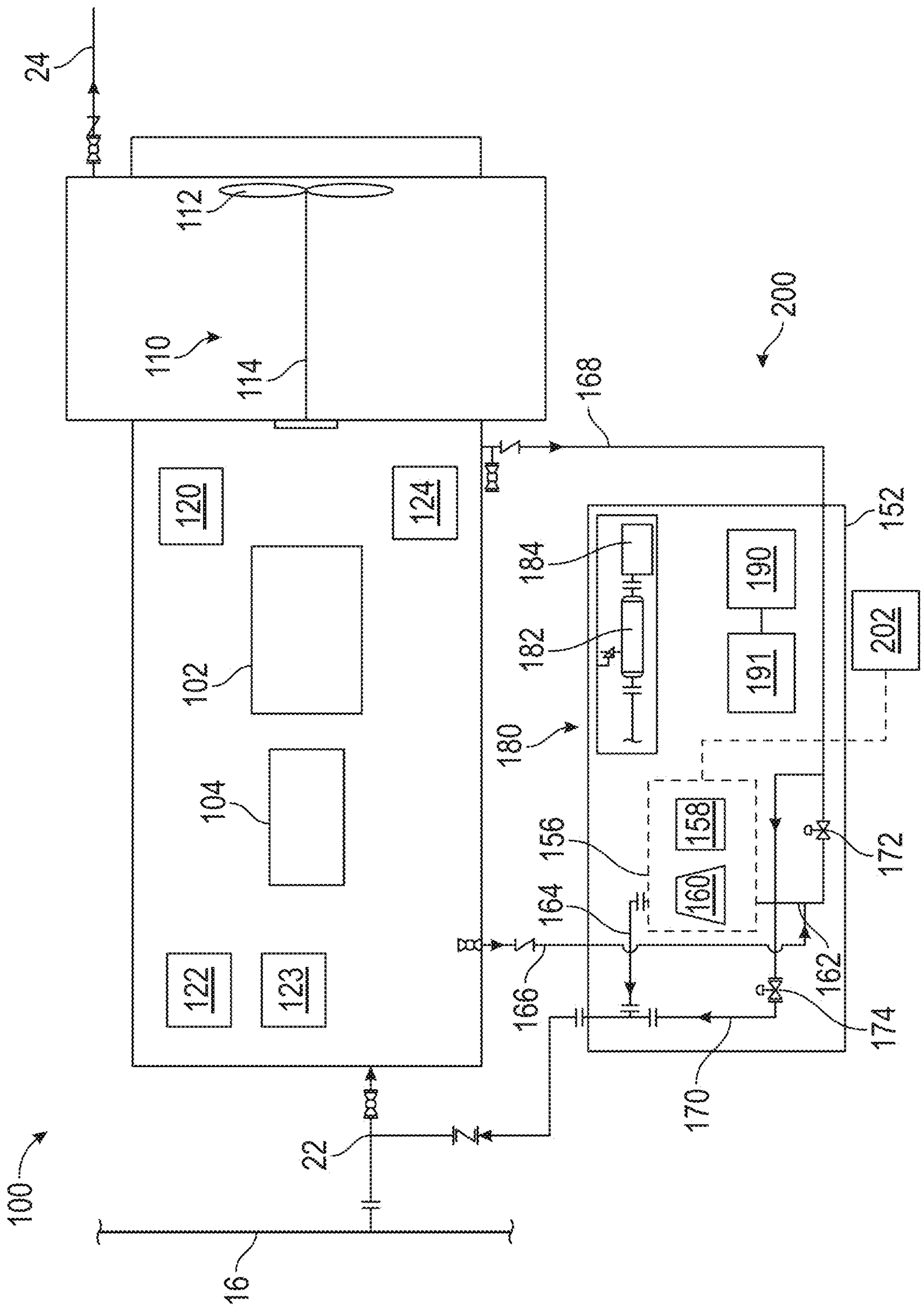
FIG. 6 is a schematic view of other embodiments of a compressor package and an emissions management module of the natural gas system of FIG. 1.

Referring now to FIG. 6, another embodiment of an emissions management module 200 of a natural gas system is shown. The emissions management module 200 shown in FIG. 6 may comprise one or more of the emissions management modules 40 of the natural gas system 10 shown in FIG. 1 or the natural gas systems 50, 70, and 95 shown in FIGS. 2-4, respectively (or other natural gas systems). Emissions management module 200 includes features in common with emissions management module 150 shown in FIG. 5, and shared features are labeled similarly.

Particularly, emissions management module 200 does not include the onboard power source 154 of emissions management module 150. Instead, emissions management module 200 is powered by an external power source (indicated schematically by box 202 in FIG. 6) not located on the support structure 152 thereof. External power source 202 may be provided by the natural gas system 10 and thus may power other components of system 10. For example, external power source 202 may comprise an electrical power grid to which the emissions management module 200 is electrically connected. Such a configuration may be advantageous for eliminating the emissions produced by power source 154 in applications where such external electrical power is available. Alternatively, external power source 202 may comprise an offboard electrical generator or other power system for providing power to the emissions management module 200. The power received by emissions management module 200 from external power source may be 460V three-phase electrical power; however, the power supplied to emissions management module 200 by external power source 202 may vary depending on the given application.

Figure 7:
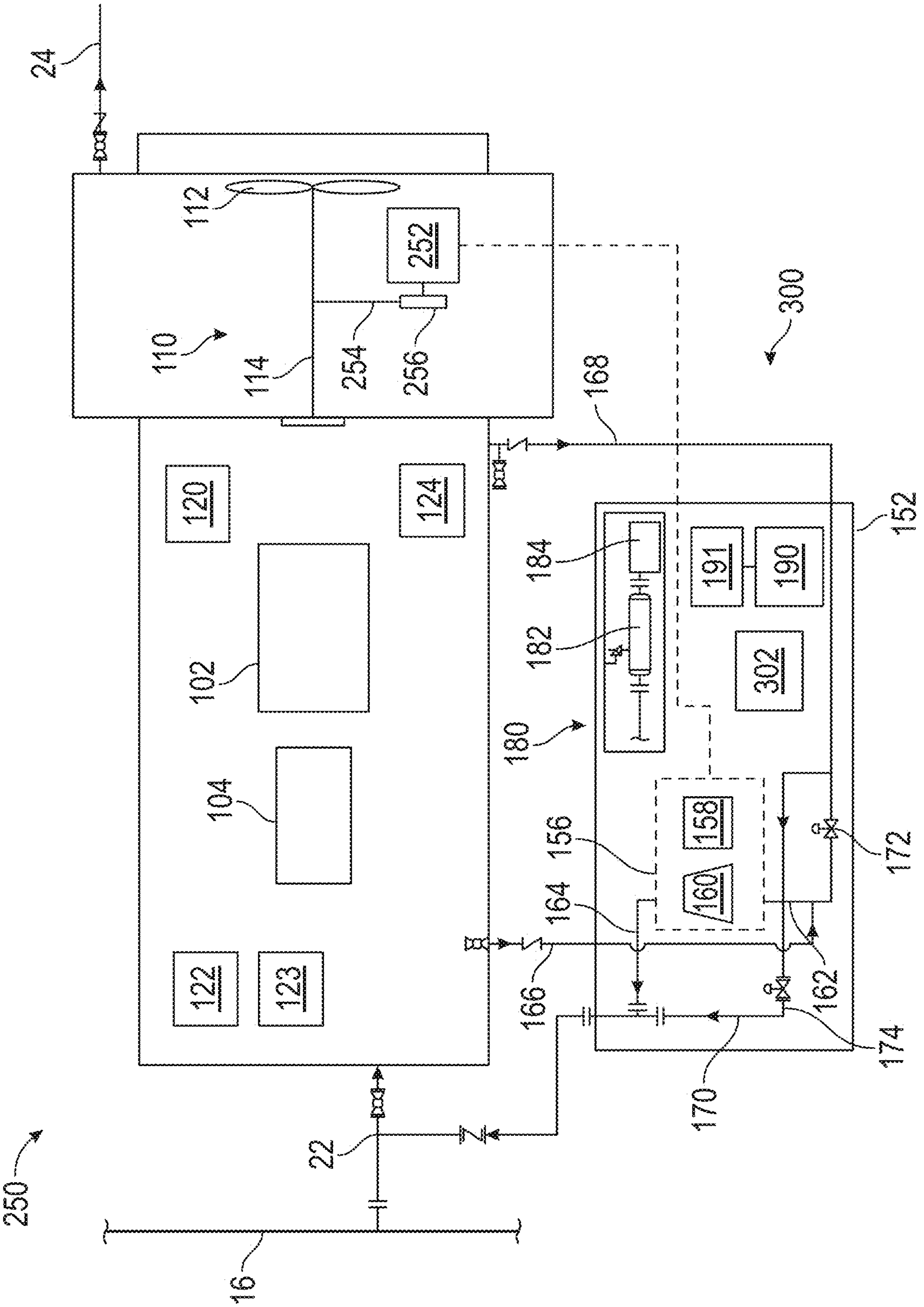
FIG. 7 is a schematic view of other embodiments of a compressor package and an emissions management module of the natural gas system of FIG. 1.

Referring now to FIG. 7, another embodiment of a compressor package 250 and an emissions management module 300 of a natural gas system are shown in greater detail. The compressor package 250 shown in FIG. 7 may comprise one or more of the compressor packages 30 while the emissions management module 300 shown in FIG. 7 may comprise one or more of the emissions management modules 40 of the natural gas system 10 shown in FIG. 1 or the natural gas systems 50, 70, and 95 shown in FIGS. 2-4, respectively (or other natural gas systems). Compressor package 250 and emissions management module 300 includes features in common with compressor package 100 and emissions management module 150, respectively, shown in FIG. 5, and shared features are labeled similarly.

Particularly, in this exemplary embodiment, compressor package 250 includes an electrical generator 252 coupled to the driveshaft 114 of cooling system 110 by a mechanical linkage 254. Linkage 254 may comprise belt(s), chain(s), gear train(s), and/or other mechanisms for transferring mechanical energy from driveshaft 114 to an input or drive gear 256 of electrical generator 252. In this configuration, rotation of the driveshaft 114 of cooling system 110 (driven by the operation of driver 102 of compressor package 100) rotates the drive gear 256 of generator 252, causing generator 252 to output electrical power. Generator 252 is electrically connected to the emissions management module 300 (which does not include onboard power source 154) whereby generator 252 may power the emissions management module 300, including the VRU 156 and/or air system 180 thereof. The power received by emissions management module 300 from generator 252 may be 460V three-phase electrical power; however, the power supplied to emissions management module 300 by generator 252 may vary depending on the given application. In this manner, the emissions provided by the onboard power source 154 of emissions management module 150 may be eliminated while also not relying on external power (e.g., an electrical power grid) which may be unavailable in at least some applications. Additionally, in this exemplary embodiment, emissions management module comprises a battery system 302 chargeable by electrical generator 252. Battery system 302 may power emissions management module 300 when the associated compressor package 250 is shut-down.

Figure 8:
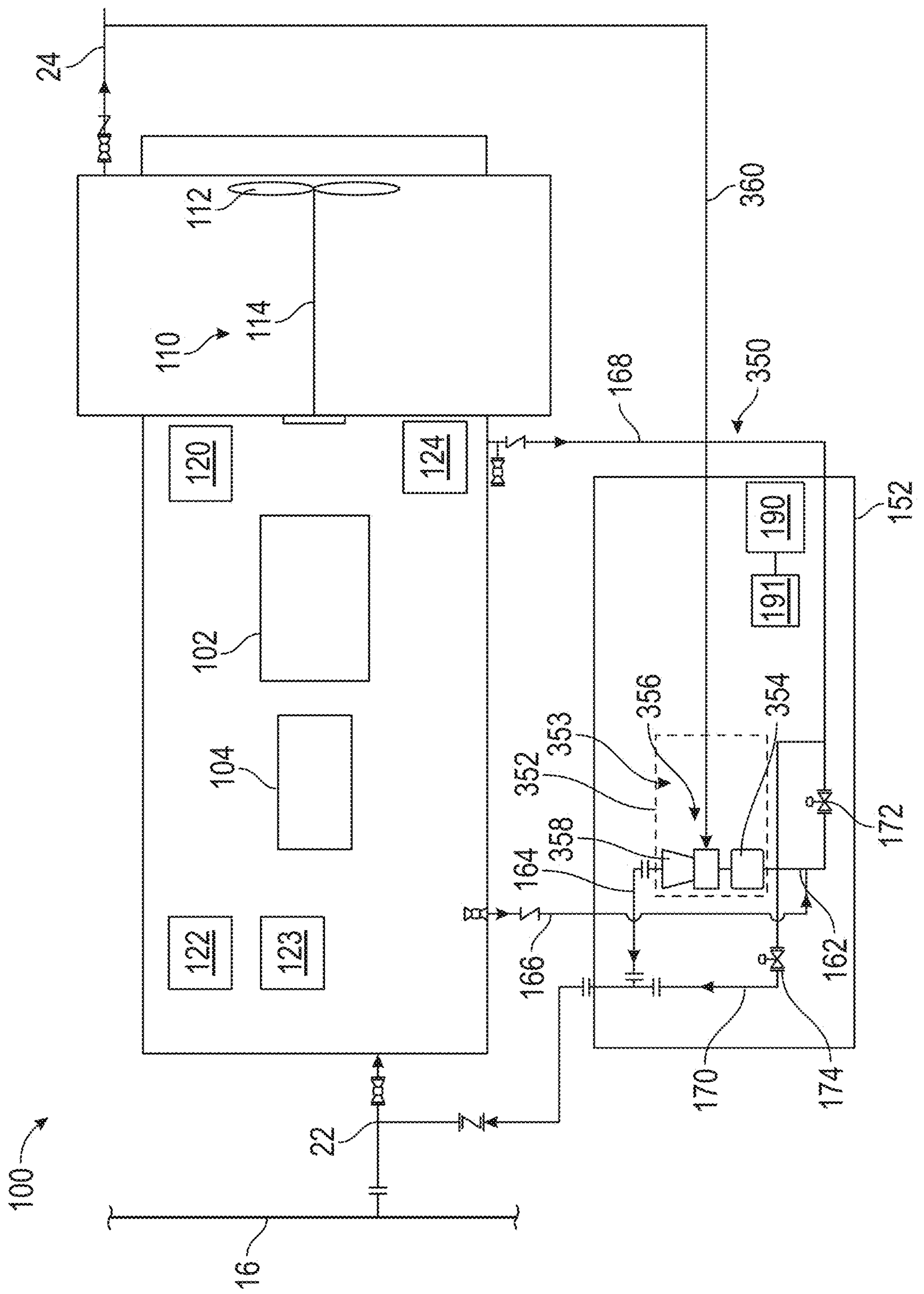
FIG. 8 is a schematic view of other embodiments of a compressor package and an emissions management module of the natural gas system of FIG. 1.

Referring now to FIG. 8, another embodiment of an emissions management module 350 of a natural gas system is shown. The emissions management module 350 shown in FIG. 8 may comprise one or more of the emissions management modules 40 of the natural gas system 10 shown in FIG. 1 or the natural gas systems 50, 70, and 95 shown in FIGS. 2-4, respectively (or other natural gas systems). Emissions management module 350 includes features in common with emissions management module 150 shown in FIG. 5, and shared features are labeled similarly. Particularly, rather than an electrically powered VRU such as the VRU 156 of emissions management module 150 shown in FIG. 5, emissions management module 350 includes a natural gas powered VRU 352 which does not rely on an electrical power source such as power source 154 for operation.

Instead, in this exemplary embodiment, VRU 352 comprises a gas circulator 353 including a suction tank or vessel 354 and a fluid powered gas ejector 356 configured to compress emissions captured from compressor package 100 to a process suction (e.g., suction conduit 22) of the compressor package 100. Particularly, gas ejector 356 of gas circulator 353 includes a nozzle-diffuser assembly 358 which receives both captured emissions from suction tank 354 and a motive fluid from discharge conduit 24 via a motive fluid conduit 360 extending between discharge conduit 24 and gas ejector 356. Gas ejector 356 may also be referred to as a venturi jet, a jet mixer, an aspirator, and a gas eductor. In other embodiments, the motive fluid provided to gas ejector 356 may be sourced from locations in addition to or other than discharge conduit 24. For example, the motive fluid supplied to gas ejector 356 may be provided from a downstream pipeline (e.g., downstream pipeline 14 shown in FIGS. 1, 2), a discharge of the natural gas system or facility in which emissions management module 350 is located, and/or from some other source or location.

In this exemplary embodiment, the nozzle-diffuser assembly 358 includes an upstream nozzle, a downstream diffuser, and a throat positioned between the nozzle and diffuser. In this configuration, the high-pressure natural gas provided to ejector 356 by discharge conduit 24 powers the compression of the captured emissions through nozzle-diffuser assembly 358 of gas ejector 356 and into the suction conduit 22. Thus, by powering ejector 356 by the high-pressure natural gas discharged by compressor package 100, VRU 352 need not employ a powered rotary or reciprocating compressor for driving the compression of captured emissions through emissions management module 350. This avoids the requirement of supplying emissions management module 350 with a potentially emissions-producing high voltage electrical power source (e.g., a power source providing 400+V). Instead, only the low-voltage control panel 190 may need be electrically powered in this exemplary embodiment, where the limited power requirements of control panel 190 may be satisfied by batteries of compressor package 100. However, in other embodiments, the emissions management module 350 may include both gas ejector 356 and a rotary or reciprocating compressor. Additionally, in some embodiments, emissions management module 350 may include a plurality of gas ejectors 356 or a combination of a rotary or reciprocating compressor and a plurality of gas ejectors 356.

Figure 9:
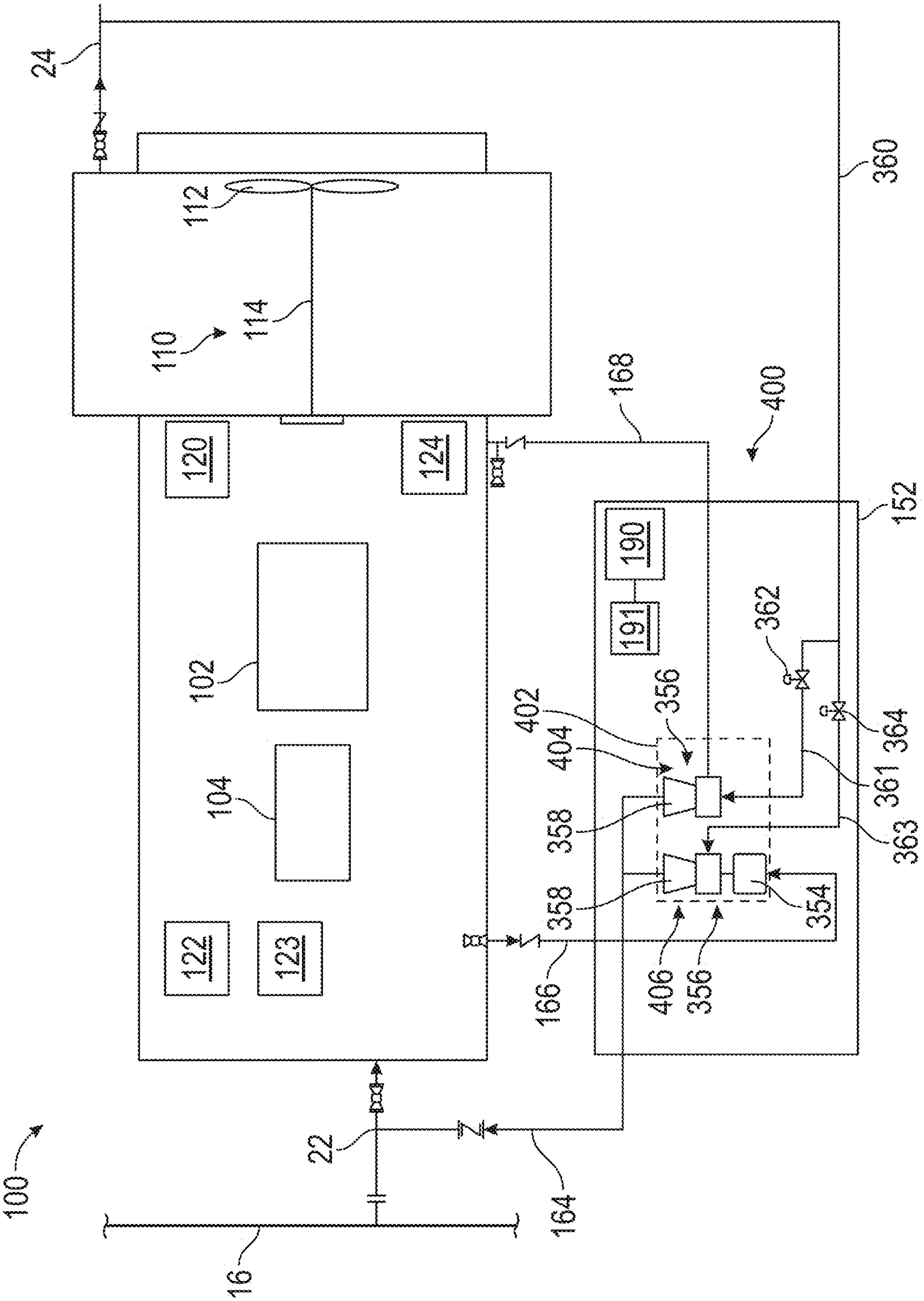
FIG. 9 is a schematic view of other embodiments of a compressor package and an emissions management module of the natural gas system of FIG. 1.

Referring now to FIG. 9, another embodiment of an emissions management module 400 of a natural gas system are shown in greater detail. The emissions management module 400 shown in FIG. 9 may comprise one or more of the emissions management modules 40 of the natural gas system 10 shown in FIG. 1 or the natural gas systems 50, 70, and 95 shown in FIGS. 2-4, respectively (or other natural gas systems such as systems). Emissions management module 400 includes features in common with emissions management module 350 shown in FIG. 8, and shared features are labeled similarly.

In this exemplary embodiment, emissions management module 400 comprises a natural gas powered VRU 402 which includes a pair of fluid or gas circulators 404 and 406 for capturing and directing different types of emissions from the compressor package 100. Each of the gas circulators 404 and 406 comprises a separate or dedicated gas ejector 356 and nozzle-diffuser assembly 358. Additionally, gas circulator 406 comprises a suction tank 354. It may be understood that in other embodiments the configuration of gas circulator 404 and/or 406 may vary from that shown in FIG. 9. A first gas circulator 404 of the pair of gas circulators 404, 406 corresponds to a high-pressure circuit of the VRU 402 while a second gas circulator 406 of the pair of gas circulators 404, 406 corresponds to a low-pressure circuit of the VRU 402 which receives emissions from compressor package 100 that are generally of a lower pressure than the emissions received by the high-pressure circuit of VRU 402. For example, the first or high-pressure gas circulator 404 of VRU 402 may receive blowdown emissions from compressor package 100 while the second or low-pressure gas circulator 406 may receive packing or other generally low-pressure emissions from compressor package 100. In this configuration, VRU 402 includes a high-pressure circuit comprising the high-pressure gas circulator 404 and a low-pressure circuit, separate from the high-pressure circuit, comprising the low-pressure gas circulator 406. Providing VRU 402 with two distinct emissions recovery circuits (the high- and low-pressure circuits thereof) may allow for the low-pressure circuit of VRU 402 to be maintained at negative or vacuum pressure, preventing captured emissions circulating through the low-pressure circuit of VRU 402 from escaping to the surrounding atmosphere. Indeed, in some embodiments VRU 402 is configured to maintain second emissions inlet conduit 168 under a vacuum such that second emissions inlet conduit 168 and the systems of compressor package 100 in fluid communication therewith (e.g., seal system 122, vent system 123) may not be exposed to positive pressure.

The ability to maintain the low-pressure circuit of VRU 402 under vacuum may allow compressor package 100 to operate a closed vent packing system which, under some regulatory authorities, may permit less frequent inspecting of the compressor package 100 and thus a reduction in costs associated with the operation of compressor package 100. Additionally, a greater variety of emissions including, for example, emissions associated with instrument gas (which cannot be exposed to positive pressure) of compressor package 100 may be captured by the low-pressure circuit of VRU 402 when the low-pressure circuit is maintained under vacuum.

In this exemplary embodiment, motive fluid conduit 360 branches into a first branch conduit 361 associated with the high-pressure circuit of VRU 402 and a second branch conduit 363 associated with the low-pressure circuit of VRU 402, where a corresponding branch valve 362 and 364 is disposed along the branch conduits 361 and 363, respectively. In this arrangement, motive fluid in the form of pressurized natural gas from discharge conduit 24 may be supplied separately to the high-pressure and low-pressure circuits of VRU 402. Additionally, branch valves 362 and 364 permit the high-pressure and low-pressure circuits of VRU 402 to be selectably isolated from discharge conduit 24. In this exemplary embodiment, pressurized natural gas is supplied from a first branch conduit 361 of the pair of branch conduits 361, 363 to the high-pressure gas circulator 404 while pressurized natural gas may be supplied from a second branch conduit 363 of the pair of branch conduits 361, 363 to the gas ejector 356 of low-pressure gas circulator 406; however, it may be understood that in other embodiments the manner in which the pressurized natural gas is supplied to gas circulators 404 and 406 may vary from the arrangement shown in FIG. 9.

In this exemplary embodiment, first emissions inlet conduit 166 is routed from the compressor package 100 to the low-pressure gas circulator 406 and thus is associated with the low-pressure circuit of VRU 402. Particularly, first emissions inlet conduit 166 connects with the suction tank 354 of the low-pressure gas circulator 406 to route low-pressure emissions from the compressor package 100 to the low-pressure gas circulator 406. Additionally, in this exemplary embodiment, second emissions inlet conduit 168 is routed from the compressor package 100 to the high-pressure gas circulator 404 and thus is associated with the high-pressure circuit of VRU 402. Specifically, second emissions inlet conduit 168 connects to the gas ejector 356 of the high-pressure gas circulator 404 to route high-pressure emissions from the compressor package 100 to the high-pressure gas circulator 404. It may be understood that the manner in which first emissions inlet conduit 166 is routed to the low-pressure gas circulator 406 and the manner in which second emissions inlet conduit 168 is routed to high-pressure gas circulator 404 may vary from the arrangement shown in FIG. 9.

Further, in this exemplary embodiment, discharge conduit 164 is routed in parallel from the discharge of the nozzle-diffuser assembly 358 of each gas circulator 404, 406 to the suction conduit 22 associated with the compressor package 100. However, it may be understood that in other embodiments the captured emissions discharged from the high- and/or low-pressure circuits of VRU 402 may be routed to locations other than suction conduit 22, including the fuel system of compressor package 100.

Figure 10:
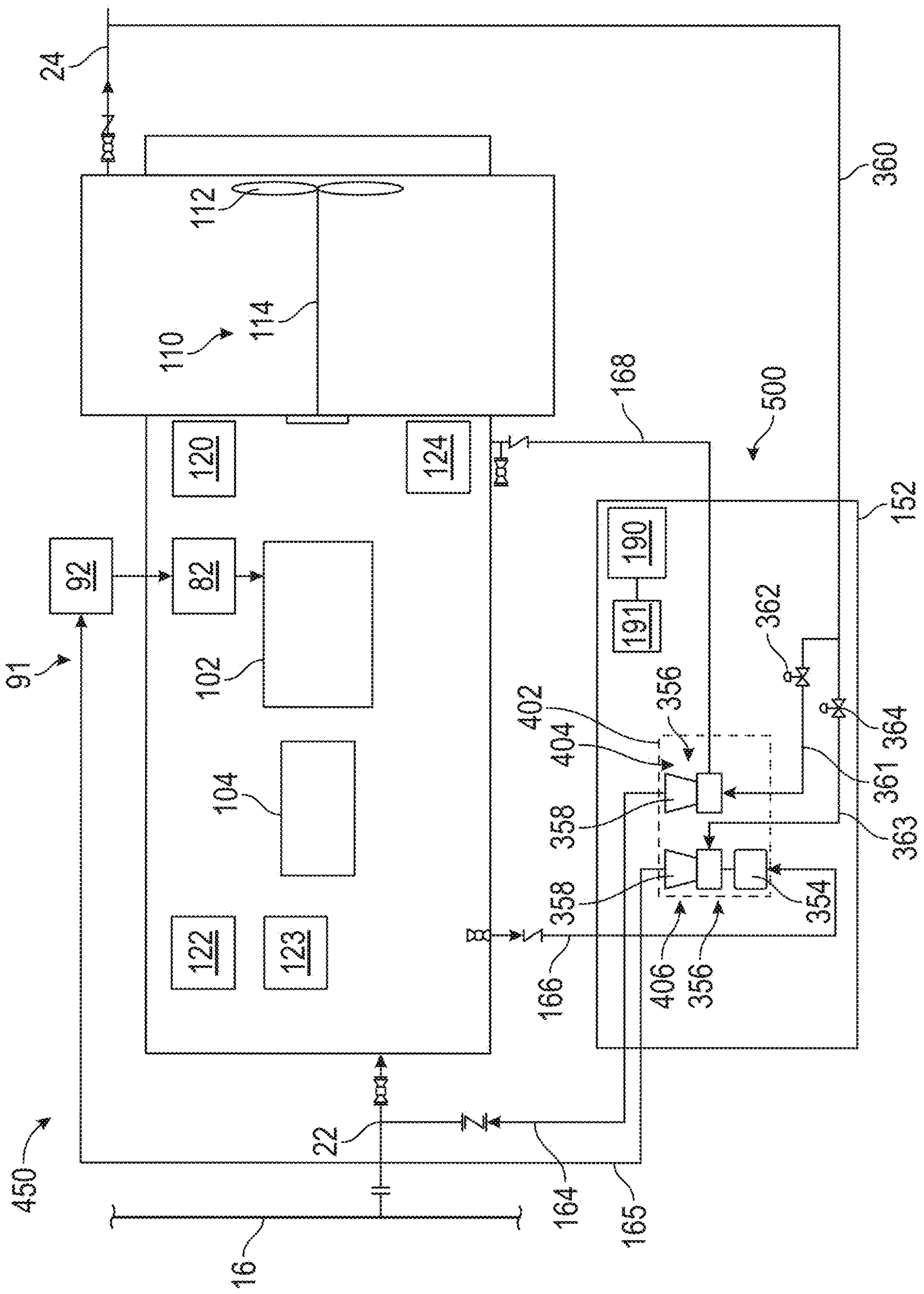
FIG. 10 is a schematic view of other embodiments of a compressor package and an emissions management module of the natural gas system of FIG. 1.

As an example, and referring now to FIG. 10, another embodiment of an emissions management module 500 of a natural gas system is shown along with an embodiment of a compressor package 450 from which the emissions management module 500 captures emissions. As shown in FIG. 10, compressor package 450 includes a fuel gas conditioner 82 as described above which is connected to a fuel header 92 of fuel system 91 of a natural gas system (e.g., fuel system 91 of the natural gas system 70 shown in FIG. 3).

The emissions management module 500 shown in FIG. 10 may comprise one or more of the emissions management modules 40 of the natural gas system 10 shown in FIG. 1 or the natural gas systems 50, 70, and 95 shown in FIGS. 2-4, respectively (or other natural gas systems). Additionally, emissions management module 500 includes features in common with emissions management module 400 shown in FIG. 9, and shared features are labeled similarly. Particularly, emissions management module 500 is similar to module 400 except that only the emissions discharged from the high-pressure circuit of VRU 402 thereof are routed by discharge conduit 164 to the suction conduit 22. In this exemplary embodiment, the emissions discharged from the low-pressure circuit of the VRU 402 of emissions management module 500 are routed by a second or fuel discharge conduit 165 from the discharge of the nozzle-diffuser assembly 358 of the low-pressure gas circulator 406 to the fuel header 92, where at least some of the emissions may be directed from the fuel header 92 to the fuel gas conditioner 82 of compressor package 450 prior to being consumed by the driver 102 of compressor package 450.

While in this exemplary embodiment the high-pressure circuit of the VRU 402 of emissions management module 500 is connected to the suction conduit 22 while the low-pressure circuit of VRU 402 is connected to the fuel system 91, in other embodiments the arrangement of the high- and low-pressure circuits of VRU 402 may be reversed, with the high-pressure circuit of VRU 402 connected to the fuel system 91 and the low-pressure circuit of VRU 402 connected to suction conduit 22. Alternatively, both the high-pressure circuit and low-pressure circuit of VRU 402 may be connected to the fuel system 91.

Figure 11:
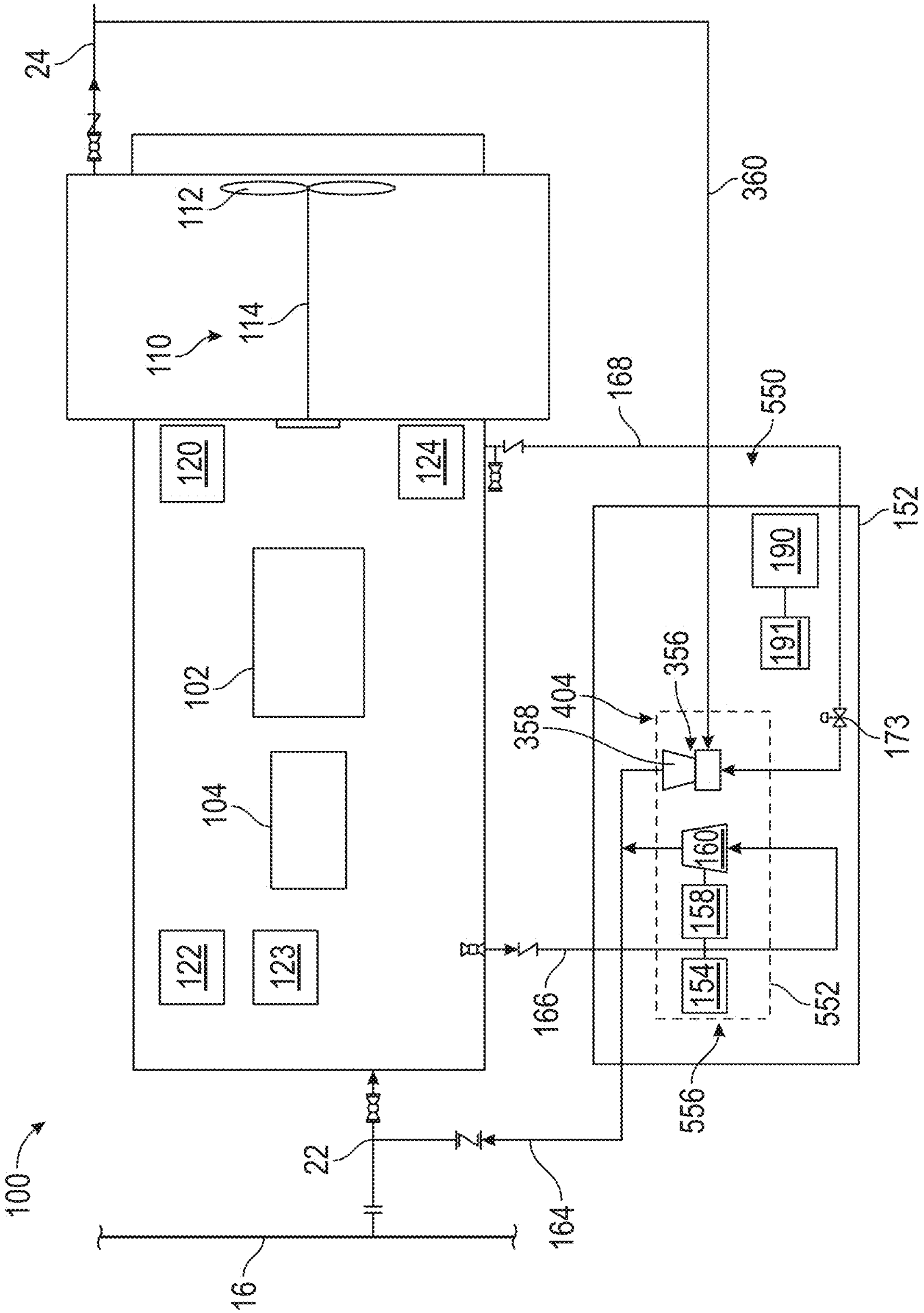
FIG. 11 is a schematic view of other embodiments of a compressor package and an emissions management module of the natural gas system of FIG. 1.

Referring now to FIG. 11, another embodiment of an emissions management module 550 of a natural gas system is shown. The emissions management module 550 shown in FIG. 11 may comprise one or more of the emissions management modules 40 of the natural gas system 10 shown in FIG. 1 or the natural gas systems 50, 70, and 95 shown in FIGS. 2-4, respectively (or other natural gas systems). Additionally, emissions management module 550 includes features in common with emissions management modules 150 and 400 shown in FIGS. 5 and 9, respectively, and shared features are labeled similarly.

Particularly, in this exemplary embodiment, emissions management module 550 comprises a VRU 552 including a high-pressure circuit comprising the high-pressure gas circulator 404, and a low-pressure circuit that is separate from the high-pressure circuit and comprises a low-pressure gas circulator 556 that is different in configuration from the low-pressure gas circulator 406 (shown in FIG. 9) described above. Specifically, in this exemplary embodiment, low-pressure gas circulator 556 comprises motor 158 and compressor 160, where motor 158 is powered by onboard power source 154 as described in greater detail above. It may be understood that while in this exemplary embodiment the low-pressure gas circulator 556 comprises compressor 160, in other embodiments, the high-pressure gas circulator 404 of VRU 552 may instead comprise the compressor 160 while the low-pressure gas circulator 556 may instead comprise the gas ejector 356.

Additionally, in this exemplary embodiment, both the low-pressure and high-pressure circuits of VRU 552 discharge into the suction conduit 22 associated with compressor package 100 through the discharge conduit 164 which is connected in parallel to the discharge of both the high-pressure gas circulator 404 and the low-pressure gas circulator 556 of the VRU 552 of emissions management module 550. It may be understood of course that the emissions discharged from high-pressure gas circulator 404 and/or low-pressure gas circulator 556 may be directed to locations other than the suction conduit 22.

Figure 12:
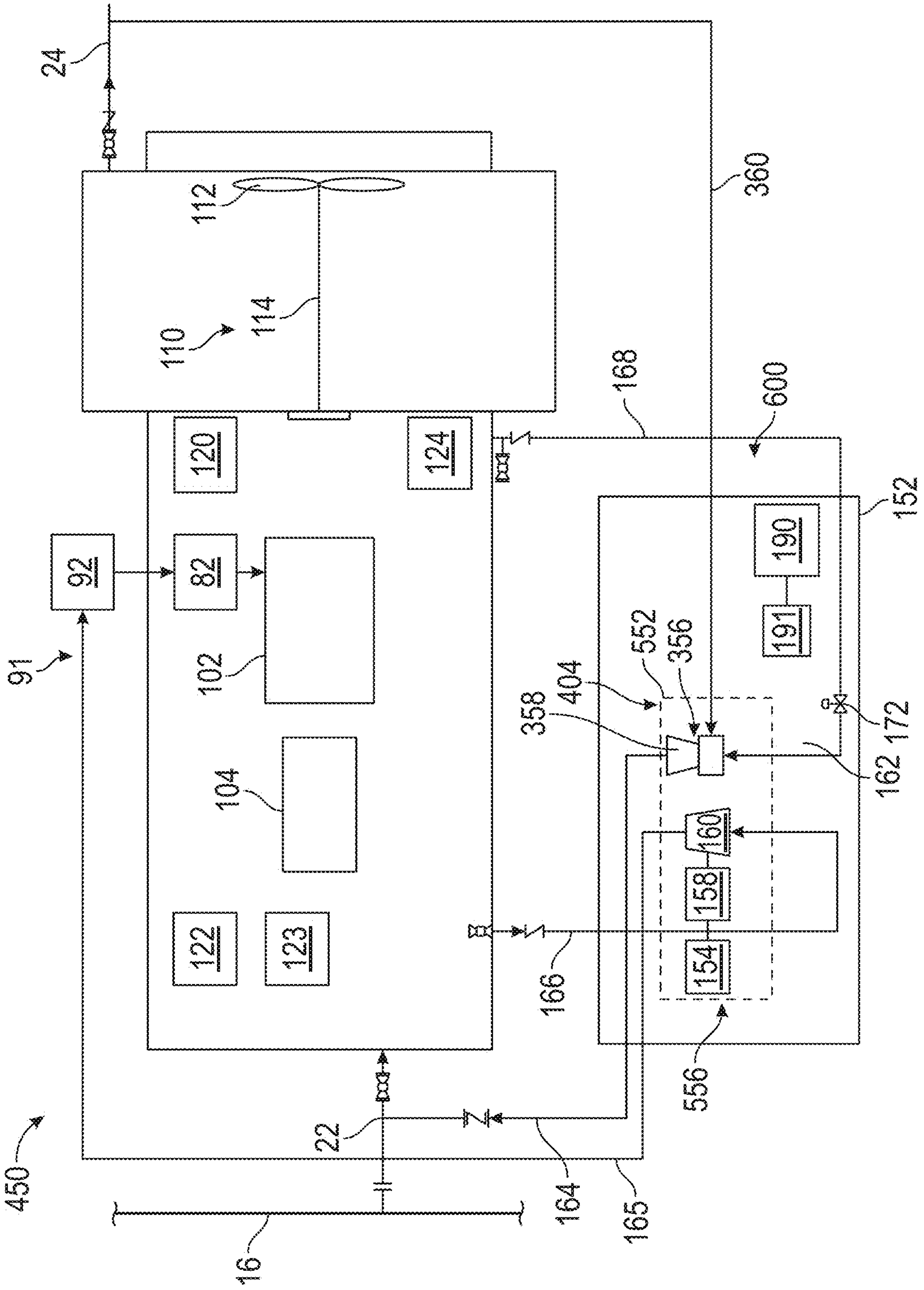
FIG. 12 is a schematic view of other embodiments of a compressor package and an emissions management module of the natural gas system of FIG. 1.

As an example, and referring now to FIG. 12, another embodiment of an emissions management module 600 of a natural gas system is shown. The emissions management module 600 shown in FIG. 12 may comprise one or more of the emissions management modules 40 and 72 shown in FIGS. 1-4. Additionally, emissions management module 600 includes features in common with emissions management module 550 shown in FIG. 11, and shared features are labeled similarly. Particularly, emissions management module 600 is similar to the module 550 of FIG. 11 except that emissions discharged from the high-pressure gas circulator 404 of the VRU 552 of emissions management module 600 is routed to the suction conduit 22 by discharge conduit 164 while emissions discharged from the low-pressure gas circulator 556 (comprising compressor 160 in this exemplary embodiment) is routed to fuel header 92 by the fuel discharge conduit 165. It may be understood of course that in other embodiments the high-pressure gas circulator 404 of VRU 552 may discharge to the fuel header 92 while the low-pressure gas circulator 556 may discharge to the suction conduit 22.

Figure 13:
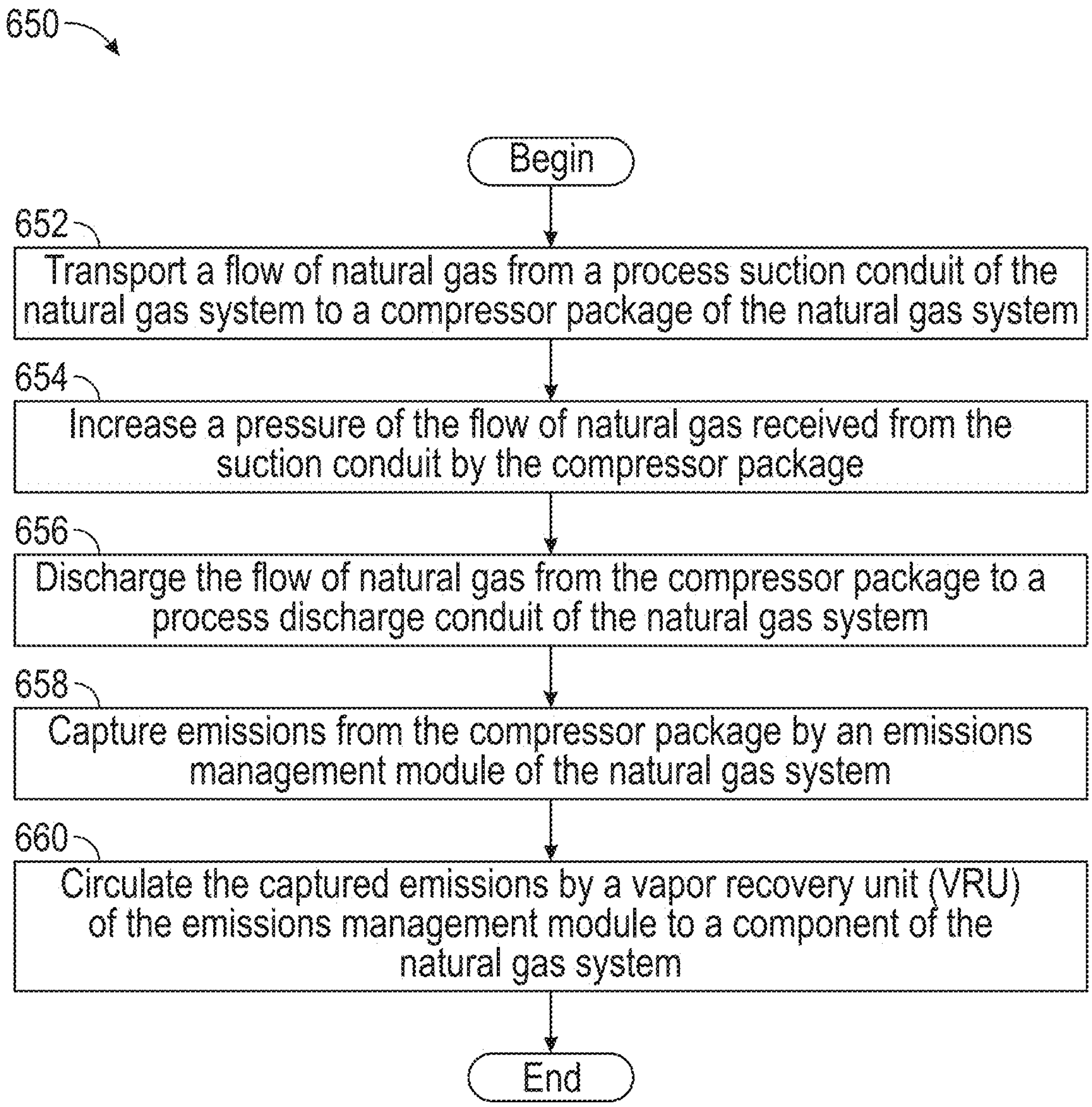
FIG. 13 is a flowchart of an embodiment of a method for capturing emissions from a compressor package of a natural gas system.

Referring to FIG. 13, an embodiment of a method 650 for capturing emissions from a compressor package of a natural gas system is shown. Beginning at block 652, method 650 comprises transporting a flow of natural gas from a process suction conduit of the natural gas system to a compressor package of the natural gas system. In some embodiments, block 652 comprises transporting a flow of natural gas from the suction header 16 and/or suction conduit 22 of the natural gas system 10 of FIG. 1 (or of natural gas systems 50, 70, and 95 of FIGS. 2-4, respectively) to one of the compressor packages 30. In certain embodiments, block 652 may comprise transporting the flow of natural gas to one of the compressor packages 100, 250 shown in FIGS. 5-8, respectively.

At block 654, method 650 comprises increasing a pressure of the flow of natural gas received from the suction conduit by the compressor package. In some embodiments, block 654 comprises increasing a pressure of the flow of natural gas received from the suction header 16 and/or suction conduit 22 by the compressor package 30. In certain embodiments, block 654 comprises increasing the pressure of the flow of natural gas by the compressor package 100 shown in FIGS. 5, 6, and 8, and/or by the compressor package 250 shown in FIG. 7. At block 656, method 650 comprises discharging the flow of natural gas from the compressor package to a discharge conduit of the natural gas system. In some embodiments, block 656 comprises discharging the flow of natural gas from compressor package 100 shown in FIGS. 5, 6, and 8, and/or the compressor package 250 shown in FIG. 7 to the discharge conduit 24/discharge header 18.

At block 658, method 650 comprises capturing emissions from the compressor package by an emissions management module of the natural gas system. In some embodiments, block 658 comprises capturing emissions from the compressor packages 30 by the emissions management modules 40 shown in FIG. 1 and FIG. 2. In some embodiments, block 658 comprises capturing emissions from the compressor package 100 by any of the emissions management modules 150, 200, 350, 400, and 550 shown in FIGS. 5, 6, 8, 9, and 11, respectively. In certain embodiments, block 658 comprises capturing emissions from the compressor package 250 by the emissions management module 300 shown in FIG. 7. In some embodiments, block 658 comprises capturing emissions from the compressor package 450 by any of the emissions management modules 500 and 600 shown in FIGS. 10 and 12, respectively.

At block 660, method 650 comprises circulating the captured emissions by a vapor recovery unit (VRU) of the emissions management module to a component of the natural gas system. In some embodiments, block 660 comprises circulating the captured emissions to the suction conduit of the natural gas system. In some embodiments, block 660 comprises circulating the captured emissions to a driver of the compressor package such as a fuel filter of the driver whereby the captured emissions may be consumed as fuel by the driver. In some embodiments, block 660 comprises circulating the captured emissions to a hydrocarbon processing component of the natural gas system separate from the compressor package and which processes a process gas (e.g., natural gas) of the natural gas system.

In certain embodiments, block 660 comprises circulating the captured emissions by the VRU 41 of the emissions management module 40 shown in FIG. 1 and FIG. 2 to the suction header 16 and/or suction conduit 22. In some embodiments, block 660 comprises circulating the captured emissions by the VRU 156 of the emissions management module 150 shown in FIG. 5 to the suction header 16 and/or suction conduit 22. In certain embodiments, block 660 comprises circulating the captured emissions by the VRU 156 of the emissions management module 200 shown in FIG. 6 to the suction header 16 and/or suction conduit 22. In some embodiments, block 660 comprises circulating the captured emissions by the VRU 156 of the emissions management module 300 shown in FIG. 7 to the suction header 16 and/or suction conduit 22. In certain embodiments, block 660 comprises circulating the captured emissions by the VRU 352 of the emissions management module 350 shown in FIG. 8 to the suction header 16 and/or suction conduit 22. In some embodiments, block 660 comprises circulating the captured emissions by the VRU 402 of the emissions management module 400 shown in FIG. 9 to the suction header 16 and/or suction conduit 22. In some embodiments, block 660 comprises circulating the captured emissions by the VRU 552 of the emissions management module 550 shown in FIG. 11 to the suction header 16 and/or suction conduit 22.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. A natural gas system, comprising:

a process suction conduit;

a compressor package connected downstream of the process suction conduit and configured to receive a flow of natural gas from the process suction conduit and to increase a pressure of the flow of natural gas whereby the flow of natural gas is discharged from the compressor package as a pressurized flow of natural gas;

a process discharge conduit connected downstream of the compressor package and configured to receive the flow of natural gas discharged from the compressor package; and an emissions management module coupled to the compressor package and configured to capture emissions from the compressor package, wherein the emissions management module comprises a vapor recovery unit (VRU) configured to circulate the captured emissions from the VRU along an emissions discharge conduit coupled to the VRU such that the captured emissions are discharged directly to at least one of the process suction conduit, a fuel gas system of the natural gas system, and a hydrocarbon processing component that is separate from the compressor package.

2. The natural gas system of claim 1, wherein the VRU comprises a compressor and a motor configured to drive the compressor.

3. The natural gas system of claim 2, wherein the emissions management module comprises a support structure, and a power source supported on the support structure and configured to power the motor of the VRU.

4. The natural gas system of claim 2, wherein the motor of the VRU is configured to receive electrical energy from an electrical power grid.

5. The natural gas system of claim 1, wherein the compressor package comprises:

a cooling system comprising a fan and a driveshaft configured to rotate the fan; and an electrical generator coupled to the driveshaft, wherein the generator is configured to convert rotation of the driveshaft into electrical energy, and to supply the electrical energy to the emissions management module.

6. The natural gas system of claim 1, wherein the VRU comprises a gas ejector powered by a motive fluid flow.

7. The natural gas system of claim 6, wherein the motive fluid flow comprises a flow of natural gas from the process discharge conduit.

8. The natural gas system of claim 1, further comprising an emissions inlet conduit extending from the compressor package to the VRU of the emissions management module, wherein the VRU is configured to receive emissions from at least one of a seal of a seal system of the compressor package and a vent of a vent system of the compressor package.

9. The natural gas system of claim 8, wherein the VRU is configured to maintain the emissions inlet conduit under a vacuum.

10. The natural gas system of claim 1, wherein the emissions management module comprises a support structure on which the VRU is supported, and wherein the support structure comprises a road transportable skid.

11. The natural gas system of claim 1, further comprising a plurality of the compressor packages arranged in parallel with respect to each other, and a plurality of the emissions management modules, wherein each of the emissions management modules is associated with one of the plurality of the compressor packages.

12. The natural gas system of claim 1, wherein the compressor package comprises a first compressor package of a plurality of compressor packages of the natural gas system, and wherein the emissions management module is connected to the plurality of compressor packages in parallel whereby the emissions management module is configured to capture emissions from each of the plurality of compressor packages.

13. The natural gas system of claim 1, wherein the VRU of the emissions management module is configured to circulate the captured emissions to a fuel header connected to, and upstream from, a fuel gas conditioner of the compressor package.

14. An emissions management module for a natural gas system, comprising:

a support structure;

a first emissions inlet conduit supported on the support structure and configured to receive a first stream of emissions from the natural gas system;

a second emissions inlet conduit supported on the support structure and configured to receive a second stream of emissions separate from the first stream of emissions;

a vapor recovery unit (VRU) supported on the support structure connected to both the first emissions inlet conduit and the second emissions inlet conduit, wherein the VRU comprises a gas circulator in fluid communication with the first emissions inlet conduit and the second emissions inlet conduit; and an emissions discharge conduit connected to the VRU and configured to circulate the first stream of emissions and the second stream of emissions from the VRU such that the captured emissions are discharged directly at least one of the process suction conduit, a fuel gas system of the natural gas system, and a hydrocarbon processing component that is separate from the compressor package.

15. The emissions management module of claim 14, wherein the support structure comprises a road transportable skid.

16. The emissions management module of claim 14, wherein the gas circulator of the VRU comprises a compressor and an electric motor configured to drive the compressor, wherein at the first and second streams of emissions are directed to the compressor.

17. The emissions management module of claim 16, further comprising a power source supported on the support structure and configured to power the motor of the VRU.

18. The emissions management module of claim 17, wherein the motor of the VRU is configured to receive electrical energy from an electrical power grid.

19. The emissions management module of claim 14, wherein the VRU comprises the gas ejector powered by a flow of natural gas from a process discharge conduit.

20. The emissions management module of claim 14, wherein the emissions discharge conduit is connected between the VRU and a fuel gas conditioner of the natural gas system defining a flowpath for at least one of the first stream of emissions and the second stream of emissions extending from the VRU to the fuel gas conditioner.

21. The emissions management module of claim 14, wherein the component comprises a hydrocarbon processing component of the natural gas system which receives an input process stream of the natural gas system and discharges a discharged process stream of the natural gas system.

22. The emissions management module of claim 14, further comprising a control panel configured to control the operation of the VRU of the emissions management module and a power source for powering the control panel, wherein the power source comprises one or more batteries charged by a solar panel.

23. A method for capturing emissions from a compressor package of a natural gas system, the method comprising:

(a) transporting a flow of natural gas from a process suction conduit of the natural gas system to a compressor package of the natural gas system;

(b) increasing a pressure of the flow of natural gas received from the process suction conduit by the compressor package;

(c) discharging the flow of natural gas from the compressor package to a process discharge conduit of the natural gas system;

(d) capturing emissions from the compressor package by an emissions management module of the natural gas system; and (e) circulating the captured emissions by a vapor recovery unit (VRU) of the emissions management module such that the captured emissions are discharged directly to at least one of the process suction conduit, a fuel gas system of the natural gas system, and a hydrocarbon processing component that is separate from the compressor package.

24. The method of claim 23, further comprising:

(f) generating electrical energy by an electrical generator coupled to a driveshaft of a cooling system of the compressor package, the electrical generator configured to generate the electrical energy in response to rotation of the driveshaft; and (g) supplying the electrical energy to the emissions management module.

25. The method of claim 23, wherein (e) comprises transporting the captured emissions by a gas ejector of the VRU, wherein the gas ejector is powered by a motive fluid flow.

26. The method of claim 25, wherein the motive fluid flow comprises a flow of natural gas discharged by the compressor package.

27. The method of claim 23 wherein (e) comprises circulating the captured emissions by the VRU to at least one of a fuel header connected to, and upstream from, a fuel gas conditioner of the compressor package, and a hydrocarbon processing component that is separate from the compressor package.

28. A natural gas system, comprising:

a process suction conduit;

a compressor package connected downstream of the process suction conduit and configured to receive a flow of natural gas from the process suction conduit and to increase a pressure of the flow of natural gas whereby the flow of natural gas is discharged from the compressor package as a pressurized flow of natural gas;

a process discharge conduit connected downstream of the compressor package and configured to receive the flow of natural gas discharged from the compressor package; and an emissions management module coupled to the compressor package and configured to capture emissions from the compressor package, wherein the emissions management module comprises a vapor recovery unit (VRU) configured to circulate the captured emissions from the VRU along an emissions discharge conduit coupled to the VRU such that the captured emissions are discharged from a gas ejector directly to at least one of the process suction conduit, a fuel gas system of the natural gas system, and a hydrocarbon processing component that is separate from the compressor package.

29. The natural gas system of claim 28, wherein the captured emissions are circulated and pressurized by the compressor and a motor configured to drive the compressor.

30. The natural gas system of claim 28, wherein the VRU comprises a gas ejector powered by a motive fluid flow.

31. The natural gas system of claim 30, wherein the motive fluid flow comprises a flow of natural gas from at least one conduit and/or component of the natural gas system separate from the compressor package discharge conduit.

32. The natural gas system of claim 30, wherein the motive fluid flow comprises a flow of natural gas from the process discharge conduit.

33. The natural gas system of claim 28, further comprising an emissions inlet conduit extending from the compressor package to the VRU of the emissions management module, wherein the VRU is configured to receive emissions from at least one of a seal of a seal system of the compressor package and a vent of a vent system of the compressor package.

34. The natural gas system of claim 28, wherein the emissions management module comprises a support structure on which the VRU is supported, and wherein the support structure comprises a road transportable skid.

35. The natural gas system of claim 28, further comprising a plurality of the compressor packages arranged in parallel with respect to each other, and a plurality of the emissions management modules, wherein each of the emissions management modules is associated with one of the plurality of the compressor packages.

36. The natural gas system of claim 28, wherein the compressor package comprises a first compressor package of a plurality of compressor packages of the natural gas system, and wherein the emissions management module is connected to the plurality of compressor packages in parallel whereby the emissions management module is configured to capture emissions from each of the plurality of compressor packages.

37. A natural gas system, comprising:

a process suction conduit;

a compressor package connected downstream of the process suction conduit and configured to receive a flow of natural gas from the process suction conduit and to increase a pressure of the flow of natural gas whereby the flow of natural gas is discharged from the compressor package as a pressurized flow of natural gas;

a process discharge conduit connected downstream of the compressor package and configured to receive the flow of natural gas discharged from the compressor package; and an emissions management module coupled to the compressor package and configured to capture blowdown emissions from the compressor package, wherein the emissions management module comprises a vapor recovery unit (VRU) configured to circulate the captured blowdown from the VRU along a blowdown discharge conduit coupled to the VRU to a component of the natural gas system.

38. The natural has system of claim 37, wherein the natural gas system is at lower pressure than the process discharge conduit.

39. The natural gas system of claim 37, wherein the VRU comprises a gas ejector powered by a motive fluid flow.

40. The natural gas system of claim 39, wherein the motive fluid flow comprises a flow of natural gas from at least one conduit and/or component of the natural gas system separate from the compressor package discharge conduit.

41. The natural gas system of claim 39, wherein the motive fluid flow comprises a flow of natural gas from the process discharge conduit.

42. The natural gas system of claim 37, wherein the emissions management module comprises a bypass conduit around the VRU.

43. The natural gas system of claim 37, wherein the emissions management module is configured to flow the blowdown through the VRU.

44. The natural gas system of claim 37, wherein the emissions management module is configured to receive blowdown from one or more compressor packages.

45. The natural gas system of claim 37, wherein the emissions management module is configured to maintain the blowdown conduit pressure above atmospheric pressure.

46. The natural gas system of claim 37, further comprising an emissions inlet conduit extending from the compressor package to the VRU of the emissions management module, wherein the VRU is configured to receive emissions from at least one of a seal of a seal system of the compressor package and a vent of a vent system of the compressor package.

47. The natural gas system of claim 46, wherein the VRU is configured to maintain the emissions inlet conduit under a vacuum or above atmospheric pressure.

48. The natural gas system of claim 37, wherein the emissions management module comprises a support structure on which the VRU is supported, and wherein the support structure comprises a road transportable skid.

49. The natural gas system of claim 37, further comprising a plurality of the compressor packages arranged in parallel with respect to each other, and a plurality of the emissions management modules, wherein each of the emissions management modules is associated with one of the plurality of the compressor packages.

50. The natural gas system of claim 37, wherein the VRU comprises a high-pressure circuit comprising a high-pressure gas circulator configured to receive a first stream of emissions from the compressor package, and a low-pressure circuit separate from the high-pressure circuit and comprising a low-pressure gas circulator configured to receive a separate second stream of emissions from the compressor package.

51. The natural gas system of claim 50, wherein at least one of the high-pressure gas circulator and the low-pressure gas circulator comprises a compressor.

52. The natural gas system of claim 50, wherein at least one of the high-pressure gas circulator and the low-pressure gas circulator comprises a gas ejector.

53. The natural gas system of claim 50, wherein one of the high-pressure gas circulator and the low-pressure gas circulator discharges into a fuel gas system of the compressor package.

54. The natural gas system of claim 37, wherein the compressor package comprises a first compressor package of a plurality of compressor packages of the natural gas system, and wherein the emissions management module is connected to the plurality of compressor packages in parallel whereby the emissions management module is configured to capture emissions from each of the plurality of compressor packages.

55. The natural gas system of claim 37, wherein the VRU of the emissions management module is configured to circulate the captured emissions to a fuel header connected to, and upstream from, a fuel gas conditioner of the compressor package.

* * * * *